(12) United States Patent
Nahmias et al.

(10) Patent No.: US 12,085,790 B2
(45) Date of Patent: *Sep. 10, 2024

(54) PHOTONIC BANDGAP PHASE MODULATOR, OPTICAL FILTER BANK, PHOTONIC COMPUTING SYSTEM, AND METHODS OF USE

(71) Applicant: Luminous Computing, Inc., Santa Clara, CA (US)

(72) Inventors: Mitchell A. Nahmias, Santa Clara, CA (US); Michael Gao, Santa Clara, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,871

(22) Filed: Apr. 14, 2023

(65) Prior Publication Data
US 2023/0305324 A1 Sep. 28, 2023

Related U.S. Application Data

(63) Continuation of application No. 16/921,475, filed on Jul. 6, 2020, now Pat. No. 11,656,485.

(60) Provisional application No. 62/873,006, filed on Jul. 11, 2019.

(51) Int. Cl.
*G02F 1/21* (2006.01)
*G02F 1/025* (2006.01)
*G02F 1/03* (2006.01)
*G02F 1/035* (2006.01)

(52) U.S. Cl.
CPC ............ *G02F 1/0327* (2013.01); *G02F 1/025* (2013.01); *G02F 1/035* (2013.01); *G02F 2202/32* (2013.01); *G02F 2203/50* (2013.01)

(58) Field of Classification Search
CPC .......................... G02F 1/025; G02F 2202/32
USPC ......................................................... 385/1–3
See application file for complete search history.

(56) References Cited

U.S. PATENT DOCUMENTS

| | | |
|---|---|---|
| 5,138,677 A | 8/1992 | O'Shaughnessy et al. |
| 6,137,604 A | 10/2000 | Bergano |
| 6,417,965 B1 | 7/2002 | Ye et al. |
| 6,452,681 B1 | 9/2002 | Carver et al. |
| 6,529,276 B1 | 3/2003 | Myrick |
| 6,825,963 B2 | 11/2004 | Kittaka et al. |
| 7,005,669 B1 | 2/2006 | Lee |
| 7,113,705 B2 | 9/2006 | Carrick et al. |
| 7,206,477 B2 | 4/2007 | Madsen |
| 7,298,949 B2 | 11/2007 | Gothoskar et al. |
| 7,310,454 B2 | 12/2007 | Akiyama et al. |
| 7,310,468 B2 | 12/2007 | Kittaka et al. |
| 7,333,732 B2 | 2/2008 | Domagala |

(Continued)

*Primary Examiner* — Robert Tavlykaev
(74) *Attorney, Agent, or Firm* — Stratford Group Ltd.

(57) ABSTRACT

A photonic computing system, preferably including an input module, a computation module, and/or control module. The photonic computing system can include one or more optical filter banks, such as in the computation module and/or any other suitable modules. Each optical filter bank preferably includes a plurality of photonic bandgap phase modulators. Each photonic bandgap phase modulator preferably includes a set of photonic crystal segments. The photonic crystal segments can preferably be controlled to transition light propagation between two or more photonic bands.

18 Claims, 19 Drawing Sheets

(56) References Cited

U.S. PATENT DOCUMENTS

| | | |
|---|---|---|
| 7,421,179 B1 | 9/2008 | Jiang et al. |
| 7,474,408 B2 | 1/2009 | Alphonse |
| 8,027,587 B1 | 9/2011 | Watts |
| 8,705,920 B2 | 4/2014 | Tokushima |
| 9,197,471 B1 | 11/2015 | Zanoni et al. |
| 9,407,369 B2 | 8/2016 | Yu |
| 9,496,964 B2 | 11/2016 | Sinsky et al. |
| 9,831,957 B2 | 11/2017 | Abiri et al. |
| 10,009,135 B2 | 6/2018 | Tait et al. |
| 10,133,141 B2 | 11/2018 | Evans et al. |
| 10,454,580 B2 | 10/2019 | Gu et al. |
| 10,627,697 B2 * | 4/2020 | Hendrickson ........ G02B 6/1225 |
| 10,670,860 B2 | 6/2020 | Tait et al. |
| 10,763,974 B2 | 9/2020 | Bunandar et al. |
| 2004/0027646 A1 | 2/2004 | Miller et al. |
| 2004/0170351 A1 | 9/2004 | Fishman et al. |
| 2004/0184711 A1 | 9/2004 | Bradley et al. |
| 2005/0117916 A1 | 6/2005 | Kropp et al. |
| 2005/0259999 A1 | 11/2005 | Covey |
| 2006/0067696 A1 | 2/2006 | Kai |
| 2007/0052498 A1 | 3/2007 | Pan et al. |
| 2007/0212076 A1 | 9/2007 | Roberts et al. |
| 2007/0230871 A1 | 10/2007 | Bidnyk et al. |
| 2010/0156679 A1 | 6/2010 | Ehrlichman et al. |
| 2011/0044573 A1 | 2/2011 | Webster et al. |
| 2011/0234435 A1 | 9/2011 | Woodward et al. |
| 2012/0197094 A1 | 8/2012 | Zhang et al. |
| 2013/0251300 A1 | 9/2013 | Suzuki et al. |
| 2014/0366647 A1 | 12/2014 | Steinhardt et al. |
| 2015/0316794 A1 | 11/2015 | Hayakawa |
| 2016/0047988 A1 | 2/2016 | Liu et al. |
| 2016/0139487 A1 | 5/2016 | Popovic et al. |
| 2017/0038609 A1 | 2/2017 | Luo et al. |
| 2017/0176779 A1 | 6/2017 | Hauenschild et al. |
| 2017/0214472 A1 | 7/2017 | Caplan et al. |
| 2017/0222400 A1 | 8/2017 | Taylor |
| 2017/0336564 A1 * | 11/2017 | Soref ................... G02F 1/3133 |
| 2018/0205465 A1 | 7/2018 | Tanaka et al. |
| 2019/0187380 A1 | 6/2019 | Fanto et al. |
| 2019/0199060 A1 | 6/2019 | Parker et al. |
| 2019/0331912 A1 | 10/2019 | Tait et al. |
| 2020/0285084 A1 | 9/2020 | Ji et al. |

* cited by examiner

PHOTONIC BANDGAP PHASE MODULATOR, OPTICAL FILTER BANK, PHOTONIC COMPUTING SYSTEM, AND METHODS OF USE

CROSS-REFERENCE TO RELATED APPLICATIONS

This application is a continuation of U.S. patent application Ser. No. 16/921,475, filed 6 Jul. 2020, now allowed, which claims the benefit of U.S. Provisional Application Ser. No. 62/873,006, filed on 11 Jul. 2019, which is incorporated in its entirety by this reference.

TECHNICAL FIELD

This invention relates generally to the optical modulation field, and more specifically to a new and useful photonic bandgap phase modulator, optical filter bank, and method of use in the optical modulation field.

BACKGROUND

Many optical modulators are based on Mach-Zehnder interferometers (MZIs) and/or microresonators. Typical MZI-based modulators require long lengths and/or high voltages to achieve sufficient modulation for many applications, which can result in large device area, high insertion loss, and/or high power consumption. Typical microresonator-based modulator operation relies on resonance of narrow bands of light with the microresonator(s), based on microresonator dimensions, and so typical microresonator-based modulators may suffer from variance, such as variance arising from fabrication tolerances and/or temperature changes.

Thus, there is a need in the optical modulation field to create a new and useful photonic bandgap phase modulator, optical filter bank, and method of use in the optical modulation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Photonic Computing System.

Figure 1A:
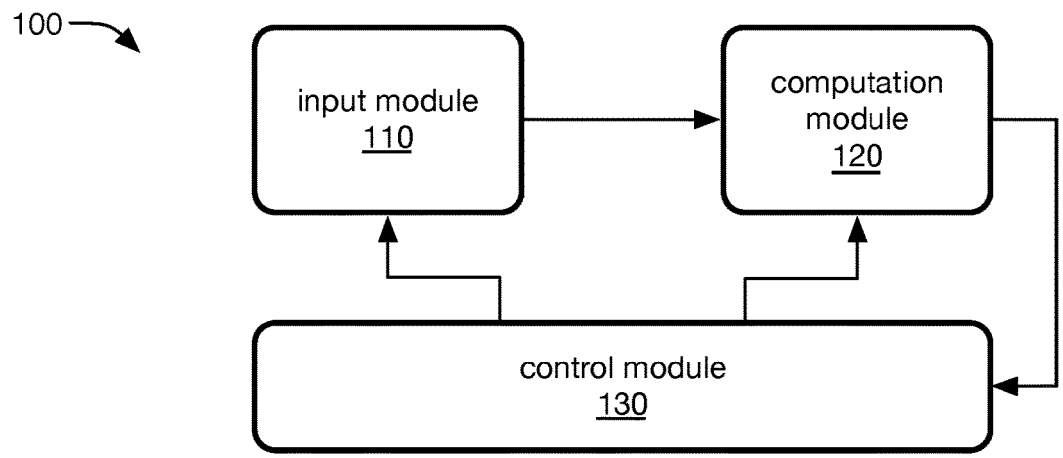
FIGS. 1A-1B are schematic representations of an embodiment of the system and an example of the embodiment, respectively.
Figure 1B:
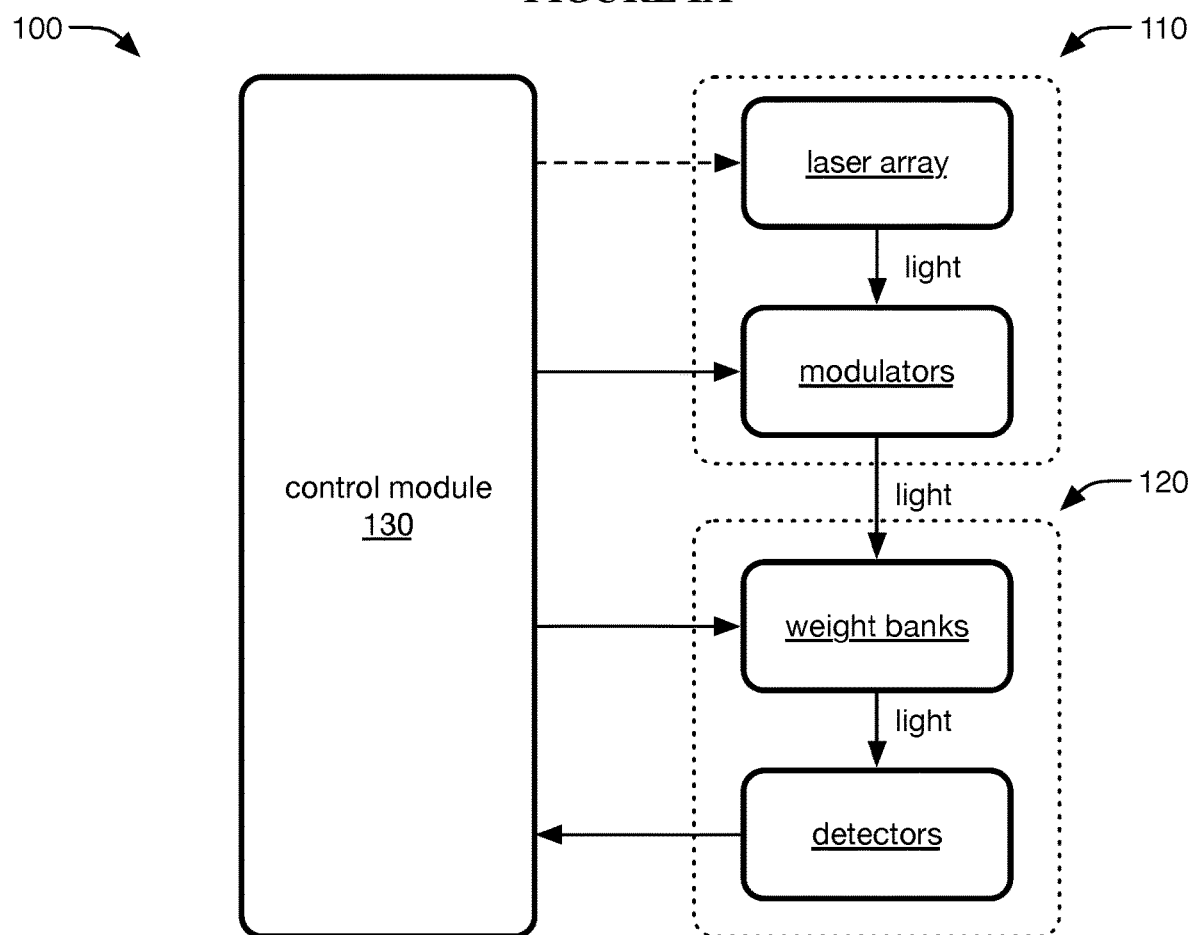

A system 100 for photonic computing preferably includes an input module 110, computation module 120, and/or control module 130 (e.g., as shown in FIGS. 1A-1B). In some embodiments, the system includes one or more elements such as described in U.S. Pat. No. 10,009,135, issued 26 Jun. 2018 and titled "System and Method for Photonic Processing", which is hereby incorporated in its entirety by this reference. However, the system can additionally or alternatively include any other suitable elements.

The system and/or elements thereof are preferably implemented as one or more integrated circuits. For example, the photonic modules (e.g., input module, computation module) and/or subsets thereof can be and/or include one or more photonic integrated circuits, and/or the entire system can be a portion of a single integrated circuit. However, the system can additionally or alternatively be implemented in any other suitable device structure(s).

1.1 Input Module.

The input module 110 preferably functions to generate a photonic representation of an input signal. The input signal is preferably representative of an input vector (e.g., encodes the input vector). Additionally or alternatively, the input signal can be representative of other information (e.g., for links between elements of the system 100 and/or between the system 100 and other photonic modules), such as encoding analog information (e.g., using pulse-amplitude modulation, such as PAM-16 and/or PAM of any other suitable level(s); using quadrature amplitude modulation; etc.), encoding digital information (e.g., using binary modulation such as on-off modulation), and/or encoding any other suitable information. The input module preferably includes one or more transducers and optionally includes one or more multiplexers, and can additionally or alternatively include any other suitable elements.

The transducers preferably function to control light transmission and/or emission at various wavelengths. The input module preferably includes a plurality of transducers. Each transducer preferably controls a different emission channel (e.g., wavelength channel, mode channel, etc.). For example, each transducer can control a different emission channel near (e.g., within a threshold distance of, substantially centered around, etc.) the 1.3 micron and/or 1.55 micron wavelength (e.g., within the 1.26-1.36 micron O-band, within the 1.53-1.565 micron C-band and/or the 1.565-1.625 micron L-band, etc.), wherein the wavelengths described herein preferably refer to the wavelength the light would have in free space, rather than to the wavelength of the light in the medium through which it is propagating. The wavelength channels are preferably narrow-band channels, such as channels of less than a threshold bandwidth (e.g., 1, 2, 5, 10, 15, 25, 40, 65, 100, 200, 500, 1000 GHz, 1-5, 5-20, 20-100, 100-300, and/or 300-1000 GHz frequency bandwidth; 0.01, 0.02, 0.05, 0.1, 0.2, 0.5, 1, 2, 5, 10, 0.01-0.05, 0.05-0.2, 0.2-1, 1-3, or 3-10 nm spectral bandwidth; etc.), but can additionally or alternatively include intermediate- and/or wide-band channels and/or channels of any other suitable widths. The channels can additionally or alternatively be associated with optical modes (e.g., transverse spatial modes, polarization modes, etc.) and/or any other suitable optical characteristics. Alternatively, a single transducer can control multiple emission channels, and/or the transducers can emit light of any other suitable wavelength(s) and/or other optical characteristics.

In some embodiments (e.g., in which the input signal encodes an input vector), each channel corresponds to a different element of the input vector. Additionally or alternatively, the channels can correspond any other suitable information (e.g., modulated such as described above), such as wherein each channel represents a different digit (e.g., bit) of the information. The emitted and/or modulated light preferably has a bandwidth significantly narrower than the width of the associated channel, such as narrower by at least a threshold relative amount (e.g., less than 0.01, 0.03, 0.1, 0.2, 0.3. 0.4, 0.5, 0.001-0.01, 0.01-0.1, 0.1-0.3, 0.3-0.5, or more than 0.5 times the width of the associated channel, etc.) and/or absolute amount (e.g., 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz, etc.), more preferably wherein the light is farther than a threshold amount (e.g., 0.25-1 times the threshold amounts described above) from either edge of the associated channel. The emitted and/or modulated light is preferably substantially centered within the associated channel (e.g., within a threshold amount of the center, such as 0.25-1 times the threshold amounts described above), but can alternatively be located at any other suitable location within the channel. The emitted light, and preferably also the modulated light (e.g., including some modulation sidebands, such as sidebands with greater than a threshold intensity and/or substantially any sidebands), of any emitter is preferably contained (or substantially contained) within a single such channel (but can alternatively span multiple channels). In one example, the emitted light has a linewidth less than a first threshold amount (e.g., 0.3, 1, 3, 10, 30, 100, 300, 1000, 3000, 0.3-3, 3-300, and/or 300-10,000 MHz, etc.), and/or the modulated light (e.g., modulated by a signal of 0.1-30 GHz, such as 3 GHZ) occupies less than a second threshold amount of spectrum (e.g., 0.1, 0.2, 0.5, 1, 2, 3, 5, 6, 8, 10, 30, 100, 0.1-0.3, 0.3-1, 1-3, 3-8, 8-20, and/or 20-100 GHz, etc.). However, the emitted and/or modulated light can additionally or alternatively occupy any other suitable amount of the spectrum.

The channels are preferably non-overlapping, more preferably having at least (and/or at most) a threshold spacing (e.g., threshold amount relative to the channel width, such as 5, 10, 25, 50, 100, 110, 125, 150, 175, 200, 250, 300, 400, 500, 0-1, 1-5, 5-15, 15-30, 30-60, 60-100, 100-110, 110-120, 120-150, 150-200, 200-300, or 300-500% of the channel width; absolute threshold amount, such as 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz; etc.) between each other (e.g., center-to-center distance, edge-to-edge distance, etc.). However, all or some of the channels can alternatively be overlapping (e.g., by no more and/or no less than a threshold amount, such as described above regarding the threshold spacing) and/or have any other suitable relationship to each other. The channels and/or emitters can be indexed based on wavelength (e.g., from shortest to longest wavelength, such as channel 1 being associated with the shortest wavelength, channel 2 being associated with the second shortest wavelength, etc.).

The transducer preferably couples light into one or more structures (e.g., on a chip), such as waveguides. The transducer is preferably an optical transducer, more preferably an electro-optical transducer (e.g., which outputs lights based on an electrical input), but can additionally or alternatively be any other suitable transducer. For example, the input module can include one or more transducers and/or other input elements (e.g., elements of the optical multiplexer, lasers and/or modulators thereof, etc.) such as described in U.S. Pat. No. 8,027,587, issued 27 Sep. 2011 and titled "Integrated Optic Vector-Matrix Multiplier", and/or in U.S. Pat. No. 10,009,135, issued 26 Jun. 2018 and titled "System and Method for Photonic Processing", each of which is hereby incorporated in its entirety by this reference.

In one embodiment, each transducer includes an emitter and an amplitude modulator. The input module can additionally or alternatively include multiple transducers that receive light from a shared emitter, such as wherein the shared emitter emits light (e.g., unmodulated or substantially unmodulated light) corresponding to multiple optical channels (e.g., multiple wavelength channels), such as shown by way of example in FIG. 2D. The emitter is preferably a laser (e.g., diode laser, preferably a component of an integrated circuit), such as a Fabry Perot cavity laser (e.g., with multiple modes, thereby outputting light of multiple wavelengths) such as a quantum dot- and/or quantum well-based FP cavity laser, an external cavity laser, a mode-locked laser (e.g., gain-absorber system) configured to output light of multiple wavelengths, a distributed feedback (DFB) laser, a distributed Bragg reflector (DBR) laser, an optical frequency comb, and/or a vertical cavity surface emitting laser, but can additionally or alternatively include an LED and/or any other suitable light emitter. In some examples, the emitter (e.g., laser, such as a DFB laser, emitting a single wavelength; laser, such as a DBR, ring, or disk laser, emitting multiple wavelengths; non-laser emitter; etc.) can be coupled to (output light to) one or more modulators (e.g., Mach-Zehnder modulators, resonator modulators, etc.), wherein the modulators are driven by one or more time-varying (e.g., oscillating) signals, thereby generating additional optical channels. In some examples, the emitter (e.g., DFB laser emitting a single wavelength, DBR laser emitting multiple wavelengths, etc.) can be coupled to (output light to) one or more nonlinear optical elements (e.g., silicon nitride ring exhibiting nonlinear optical effects). The transducer preferably includes one amplitude modulator for each emitter and/or each channel. The amplitude modulator is preferably an optical modulator, but can additionally or alternatively be an emitter modulator (e.g., of a directly-modulated emitter, such as a directly-modulated laser) or any other suitable modulator.

The optical modulator preferably functions to modulate light emitted by an emitter (or multiple emitters). The optical modulator is preferably wavelength-selective (e.g., substantially modulating only a narrow wavelength band, such as substantially modulating only light of a single channel), but can alternatively be a wideband modulator and/or have any other suitable wavelength dependence. The optical modulator can be electro-absorptive and/or electro-refractive. The optical modulator can optionally be embedded in one or more other structures, such as a resonator and/or Mach-Zehnder interferometer (MZI) (e.g., which can function to enhance its modulation performance). In examples, the optical modulator can include one or more microresonators (e.g., microring resonator, microdisk resonator, photonic crystal defect state modulator), quantum confined Stark effect (QCSE) modulator, Zeno effect modulator (e.g., graphene based modulator, such as a silicon photonic graphene modulator), MZI modulator, electro-absorptive modulator embedded in a critically coupled resonator (e.g., QCSE microdisk modulator), photonic crystal-based modulator (e.g., photonic crystal defect state modulatore, photonic bandgap phase modulator (PhBPM) such as described below in more detail, etc.), and/or any other suitable optical modulator. The optical modulator (e.g., wideband modulator, one or more narrow-band modulators, any suitable combination of wavelength-dependent modulators, etc.) can optionally be embedded in and/or in series (along the optical path) with one or more filters (e.g., spectral filters), such as an electro-absorptive modulator preceded (along the optical path) by a first filter and followed by a second filter. In some variations, the optical modulator includes multiple microresonators (e.g., as described in U.S. patent application Ser. No. 16/374, 991, filed 4 Apr. 2019 and titled "Photonic Filter Bank System and Method of Use", which is hereby incorporated in its entirety by this reference). The optical modulators can additionally or alternatively include mode modulators (e.g., as described in Lian-Wee Luo, Noam Ophir, Christine P. Chen, Lucas H. Gabrielli, Carl B. Poitras, Keren Bergmen, and Michal Lipson, "WDM-compatible mode-division multiplexing on a silicon chip," *Nat. commun.* 5, 3069 (2014), which is hereby incorporated in its entirety by this reference). In some variations, the optical modulator includes multiple filters and/or modulators coupled together using inverse design (e.g., as described in Molesky, S., Lin, Z., Piggott, A. Y. et al., "Inverse design in nanophotonics," *Nat. photon.* 12, 659-670 (2018), which is hereby incorporated in its entirety by this reference). However, the system can additionally or alternatively include any other suitable optical modulators, or include no such modulators.

The emitter modulator can function to control light emission from the emitter (or from multiple emitters). For example, the emitter modulator can provide an electrical signal that drives the associated emitter, or there can be no emitter modulator, wherein the input signal (e.g., electrical signal, such as from the control module) directly drives the emitter. For example, the transducer can be a laser device. In a first specific example, the laser includes a directly-driven laser modulator. In a second specific example, the modulated laser gain medium can be an active optical semiconductor, which can act as a subthreshold temporal integrator with time-constant equal to carrier recombination lifetime. In this specific example, the laser device itself can act as a threshold detector, rapidly dumping energy stored in the gain medium into the optical mode when the net gain of the cavity crosses unity (e.g., similar to a passively Q-switched laser biased below threshold). However, the input modulator can additionally or alternatively include any other suitable emitter modulator(s), and/or any other suitable modulators of any kind(s).

The transducers can additionally or alternatively include any other suitable elements. The transducers of the input module can be substantially the same as each other (e.g., aside from emitting at and/or modulating different wavelengths), or can be different from one another.

The multiplexer preferably functions to combine multiple optical signals (e.g., channels) onto a single output path (e.g., a waveguide), such as for wavelength-division multiplexing (WDM), but can additionally or alternatively perform any other suitable functions. The multiplexer is preferably an optical multiplexer, such as a multiplexer including one or more filter arrays (e.g., including elements such as gratings and/or circulators). In one example, the multiplexer is an arrayed waveguide grating (AWG). However, the multiplexer can additionally or alternatively be any other suitable multiplexer.

Figure 2A:
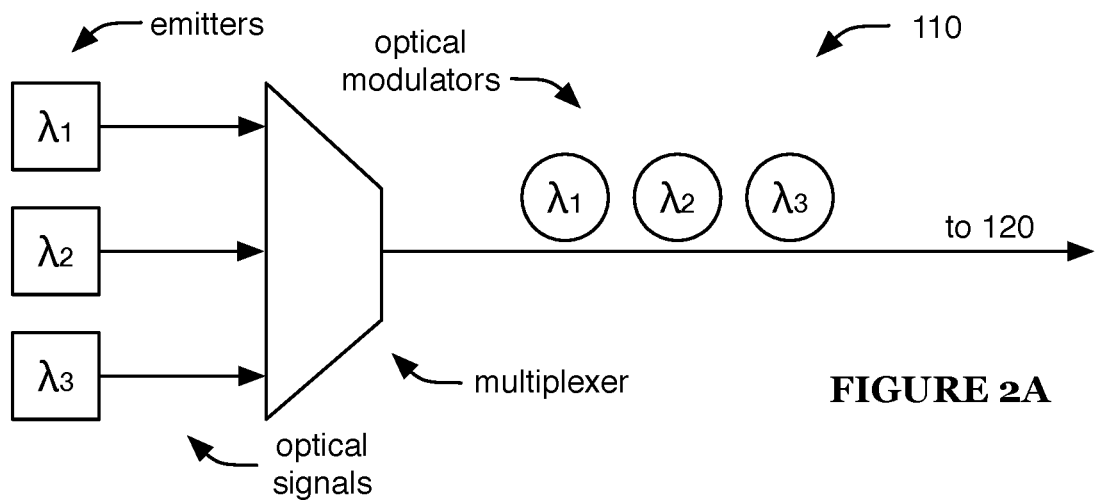
FIGS. 2A-2D are schematic representations of a first, second, third, and fourth embodiment, respectively, of the input module.

In a first embodiment of the input module, signals (e.g., unmodulated signals) from multiple emitters are combined by a multiplexer, then modulators (preferably wavelength-selective modulators, such as microresonators) alter a multiplexed signal (e.g., as shown in FIG. 2A). Preferably, each wavelength-selective modulator alters a single signal, wherein the other signals (e.g., wavelengths) pass through and/or by the modulator substantially unaltered. Additionally or alternatively, some or all of the modulators can substantially affect more than one of the signals. In a first example of this embodiment, signals (e.g., unmodulated signals) from multiple emitters (e.g., single-channel emitters, few-channel emitters such as single-wavelength multimode emitters, many-channel emitters such as comb sources, etc.) are combined by a multiplexer to form the multiplexed signal, which is then preferably provided to the modulators. In a second example, a multi-channel emitter (e.g., multi-wavelength emitter such as a comb source) generates the multiplexed (but preferably unmodulated) signal, which is then preferably provided to the modulators.

Figure 2B:
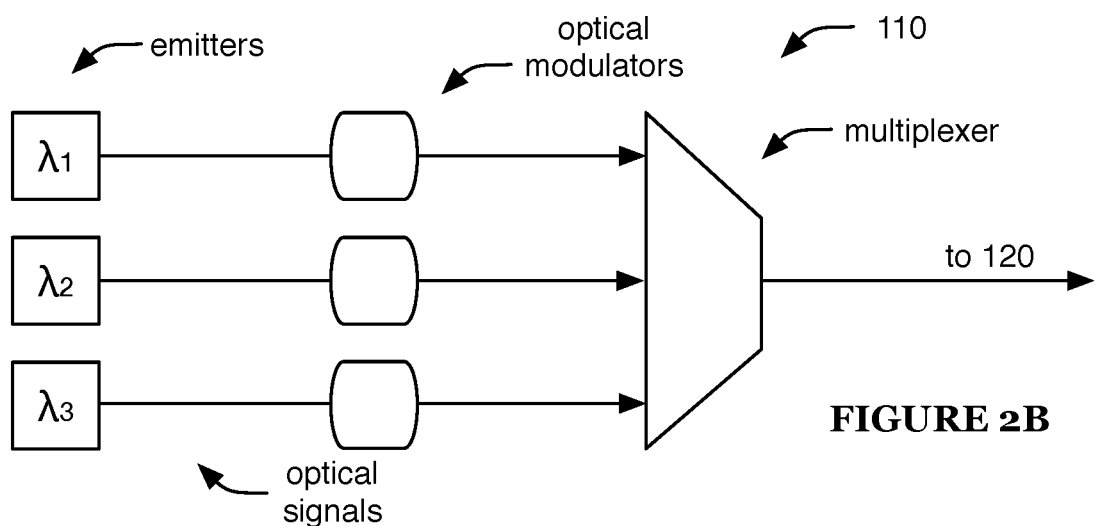
Figure 2C:
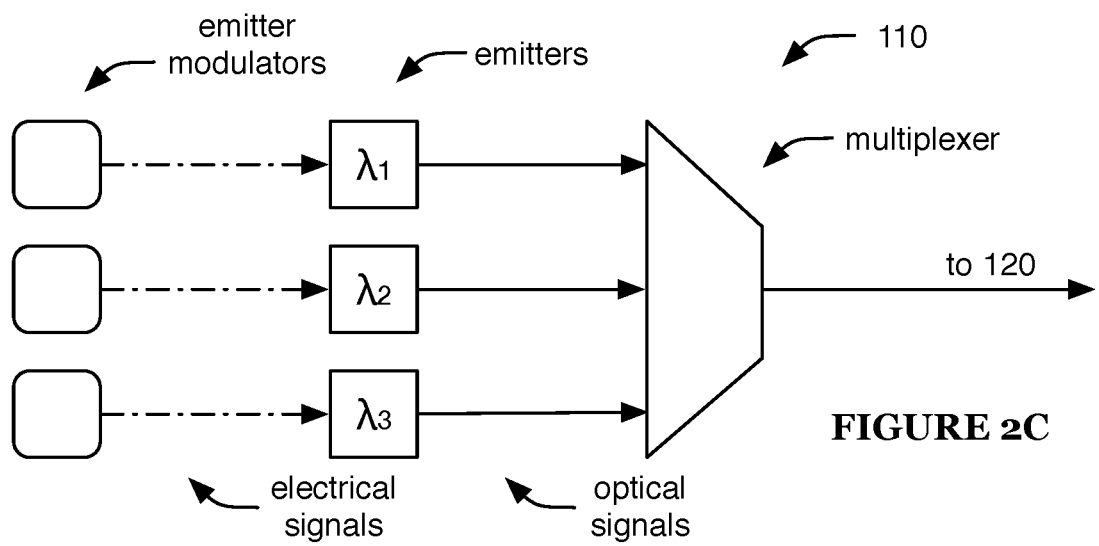
Figure 2D:
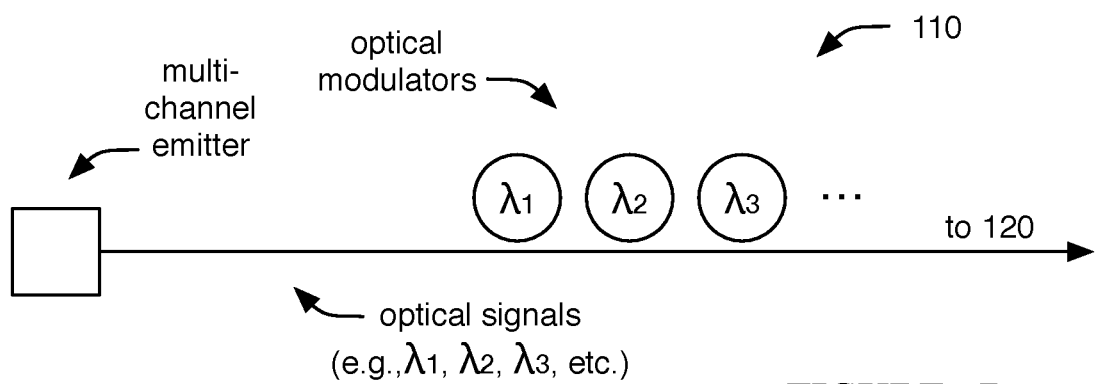

In a second embodiment, modulated signals from multiple optical transducers (e.g., electro-optical transducers) are combined by a multiplexer. In a first example of this embodiment, an optical modulator is arranged between each emitter and the multiplexer (e.g., as shown in FIG. 2B). In a second example, an emitter modulator controls each emitter (e.g., as shown in FIG. 2C).

The input module is preferably controlled by the control module (e.g., by electrical signals from the control module, such as from a data submodule of the control module). The input module preferably outputs to one or more computation modules (e.g., the WDM optical signal is sent to an input of the computation module, preferably along a waveguide; optionally wherein the optical signal is split into multiple signals, which can be sent to different computation modules). However, the input module can additionally or alternatively interface with other elements of the system in any other suitable manner, and/or the input module can additionally or alternatively include any other suitable elements in any suitable arrangement.

1.2 Computation Module.

The computation module 120 preferably functions to perform photonic computations (e.g., matrix operations such as matrix multiplications, preferably matrix-vector multiplications; Fourier transforms such as discrete Fourier transforms; convolutions; other multiply-accumulate operations; non-linear operations such as analog sigmoids; etc.) based on signals (e.g., data signals, controller signals, etc.) from the input and/or control modules. For example, the computation module can multiply an input vector (e.g., encoded by the WDM signal received from the input module) by a matrix (e.g., associated with the input signals from the control module) to determine an output vector (e.g., associated with output signals generated by the computation module). The computation module preferably includes one or more spectral filter banks 121 (e.g., optical filter banks 20, such as described below in more detail) and detectors 122, and can optionally include one or more splitters 123, interferometers, and/or combiners (e.g., as shown in FIGS. 3A-3D, 7A, and/or 7B). However, the computation module can additionally or alternatively include any other suitable elements.

1.2.1 Spectral Filter Banks.

Figure 4:
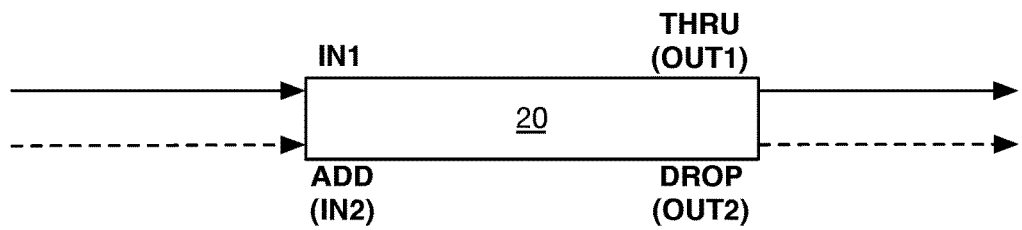
FIG. 4 is a schematic representation of a variation of a spectral filter bank.

Each spectral filter bank preferably functions to filter (e.g., filter in a substantially time-independent manner; switch, such as at a low rate; modulate at a high rate, such as comparable to the bandwidth of the input optical signal and/or the modulation rate of the modulators of the input signal; otherwise control; etc.) an optical signal based on a control signal (e.g., data signal). Each spectral filter bank preferably includes a set of filter elements, more preferably wherein each filter element is associated with (e.g., filters) a channel (or set of channels) of the input signal. The computation module preferably includes a plurality of spectral filter banks (e.g., each corresponding to a row of the matrix). Each spectral filter bank preferably receives (e.g., at an IN port of the spectral filter bank) an optical signal input (e.g., WDM signal) and a set of control signals. The optical signal input is preferably received from the splitter (e.g., along one or more of the paths onto which the signal is split), but can additionally or alternatively be received from any other suitable element. The control signals (e.g., filter weights) are preferably received from the control module, but can additionally or alternatively be received from any other suitable element. The control signals are preferably electrical signals (e.g., as described below regarding PhBPM electrical inputs), such as voltage and/or current signals, but can additionally or alternatively include any other suitable signals. The control signals preferably control operation of one or more filter elements of the spectral filter bank. The control signals preferably include one weight for each filter element, but can additionally or alternatively include any other suitable number of weights. In some embodiments, the number of filters and number of weights can be equal to the number of channels in the optical signal input (e.g., equal to the number of emitters in the input module). Each weight and filter can correspond to an element of the matrix row associated with the spectral filter bank (or to an integer number of such elements, such as 2, 4, 8, 16, 32, 2-8, 9-32, etc.). The spectral filter bank preferably outputs the filtered optical signal(s) (e.g., to one or more detectors). In some examples, the spectral filter bank has multiple optical outputs (e.g., THRU port and DROP port, OUT1 port and OUT2 port, etc.), one or more of which outputs to a detector (e.g., as shown in FIG. 4). The spectral filter bank(s) can optionally include weight banks (and/or elements thereof), modulators (e.g., one or more rows of optical amplitude modulators, preferably wherein each spectral filter bank includes one such row), and/or any other suitable elements such as described in U.S. Pat. No. 8,027,587, issued 27 Sep. 2011 and titled "Integrated Optic Vector-Matrix Multiplier", and/or in U.S. Pat. No. 10,009,135, issued 26 Jun. 2018 and titled "System and Method for Photonic Processing", each of which is hereby incorporated in its entirety by this reference (e.g., as described regarding the MRR weight bank, such as employing microring resonators, microdisk resonators, photonic crystal-based resonators, any modulators described above regarding the input modulators, and/or any other suitable filters, etc.). A person of skill in the art will recognize that each filter element can include a single filtering device, multiple filtering devices (e.g., arranged in series and/or parallel), multiple tunable elements, and/or any other suitable elements capable of filtering a channel (or set of channels) of the input signal.

Preferably, each spectral filter bank is a phase weight bank. The phase weight bank preferably includes two (or more) paths, a plurality of phase modulator elements, and a coupler (e.g., as shown in FIGS. 5A-5D). However, the phase weight bank can additionally or alternatively include any other suitable elements. Each path (e.g., waveguide) preferably receives an input from an output path of the splitter, more preferably receiving identical WDM input signals on each path, but alternatively wherein some or all paths receive different WDM input signals (e.g., wherein the paths are divided into mutually exclusive subsets, wherein each subset receives light of the same wavelengths, but encoded with different WDM input signals). Each phase weight bank preferably includes a plurality of phase modulator elements. Each phase modulator element preferably modulates the phase of a channel (e.g., a wavelength channel) on a path (or both paths) of the phase weight bank. Preferably, all the modulator elements modulate channels on the same path, but different channels can alternatively be modulated on different paths from each other. The modulator elements are preferably wavelength-specific modulators (e.g., substantially modulating only a narrow wavelength band, such as substantially modulating only light of a single channel, modulating light of a set of channels such as spectrally-adjacent channels, etc.). Each modulator element is preferably a PhBPM, such as described below in further detail (e.g., regarding the PhBPM 10 and/or optical filter bank 20). However, the phase weight banks can additionally or alternatively include microresonators and/or any other suitable optical phase modulators.

The coupler preferably functions to couple the two paths of the phase weight bank past of the phase modulator elements. For example, the coupler can be a directional coupler, such as a coupler including coupled waveguide segments. The interference between the signals on the two paths preferably generates an amplitude signal based on the signals' phase differences (e.g., phase differences imposed by the phase modulators).

The computation module can additionally or alternatively include one or more amplitude weight banks and/or any other suitable spectral filter banks. The amplitude weight banks can include weight banks (and/or elements thereof) such as described in U.S. Pat. No. 10,009,135, issued 26 Jun. 2018 and titled "System and Method for Photonic Processing", which is hereby incorporated in its entirety by this reference (e.g., as described regarding the MRR weight bank; similar to the MRR weight bank but with modulators other than microrings, such as any modulators described above regarding the input module amplitude modulators; etc.).

The filter elements (e.g., phase modulator elements) preferably function to filter and/or modulate (e.g., phase modulate, amplitude modulate, etc.) the optical input signal (e.g., wherein each filter element filters and/or modulates a different channel or set of channels of the input signal, wherein a set of filter elements cooperatively filter and/or modulate a set of channels, etc.). In a first embodiment of the spectral filter bank, every channel propagates past all the filter elements of the spectral filter bank (e.g., as shown in FIGS. 5A-5D). In a second embodiment, each channel is split onto a different sub-path to interact with a filter element associated with that channel. In a first example of this embodiment, the modulated path includes for each channel: a drop filter to branch a sub-path off the main path, a filter on that sub-path, and an add filter to rejoin the signal from the sub-path to the main path. In a second example, the modulated path includes a demultiplexer to create a plurality of sub-paths, a filter on each sub-path, and a multiplexer to recombine the sub-paths following modulation.

Figure 8A:
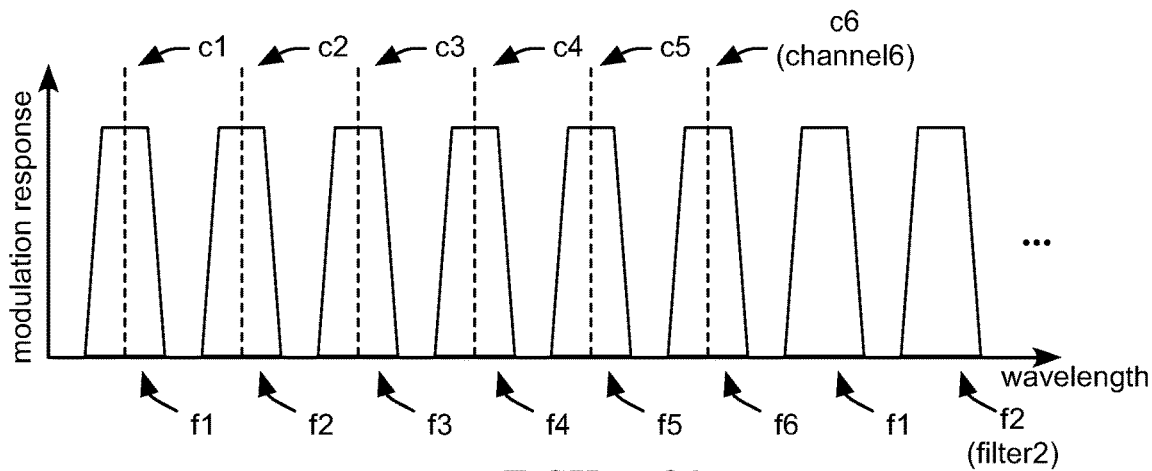
FIG. 8A is a representation of optical channels and filter modulation responses of a first example of the system.

The optical filters (e.g., phase modulator elements) are preferably PhBPMs. However, the optical filters can additionally or alternatively include, for example, microresonators (e.g., microdisc resonators, microring resonators, photonic crystal defect state filters, etc.), Bragg filters (e.g., fiber Bragg grating; Bragg reflector, preferably with a mirror and circulator such as a monolithic Bragg reflector with an optical loop mirror and a circulator; etc.), electro-refractive elements, and/or any other suitable elements. The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference). In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). Each filter of a spectral filter bank (e.g., weight bank) preferably has a different resonance wavelength (e.g., resonance wavelength under a particular set of conditions, such as a typical operating temperature and no applied voltage). Preferably, each resonance wavelength corresponds to (e.g., is within, such as substantially centered within) a different wavelength channel (e.g., as shown in FIG. 8A). However, the system can additionally or alternatively include any other suitable optical filters. Although referred to herein as optical filters, a person of skill in the art will recognize that the filters can additionally or alternatively include optical switches, optical modulators, and/or any other suitable elements.

1.2.2 Detectors.

Figure 5A:
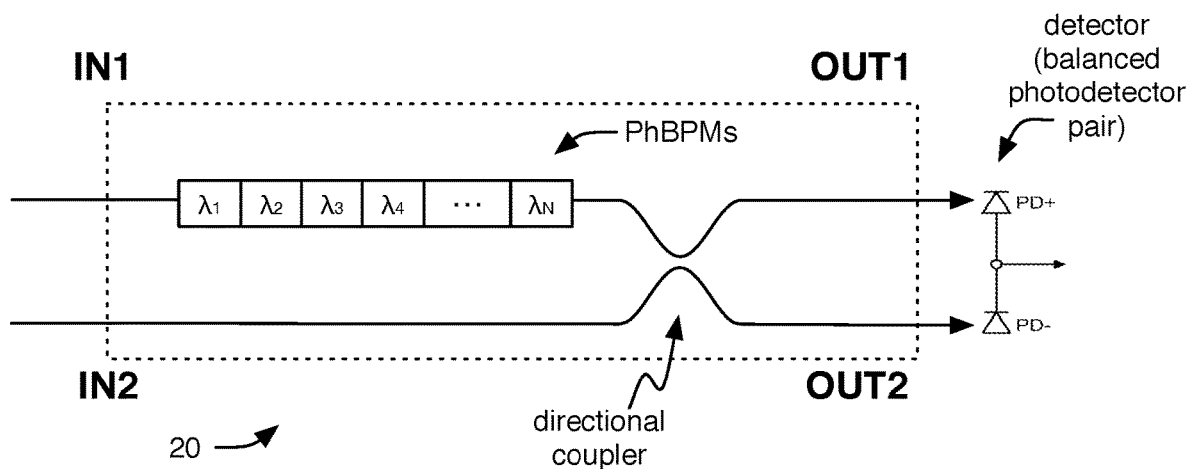
FIGS. 5A-5D are schematic representations of various examples of a phase weight bank.
Figure 5B:
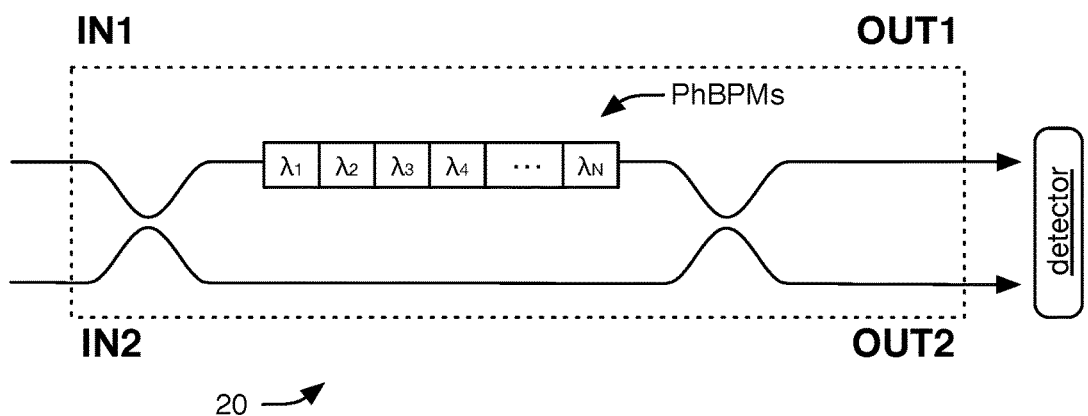
Figure 5C:
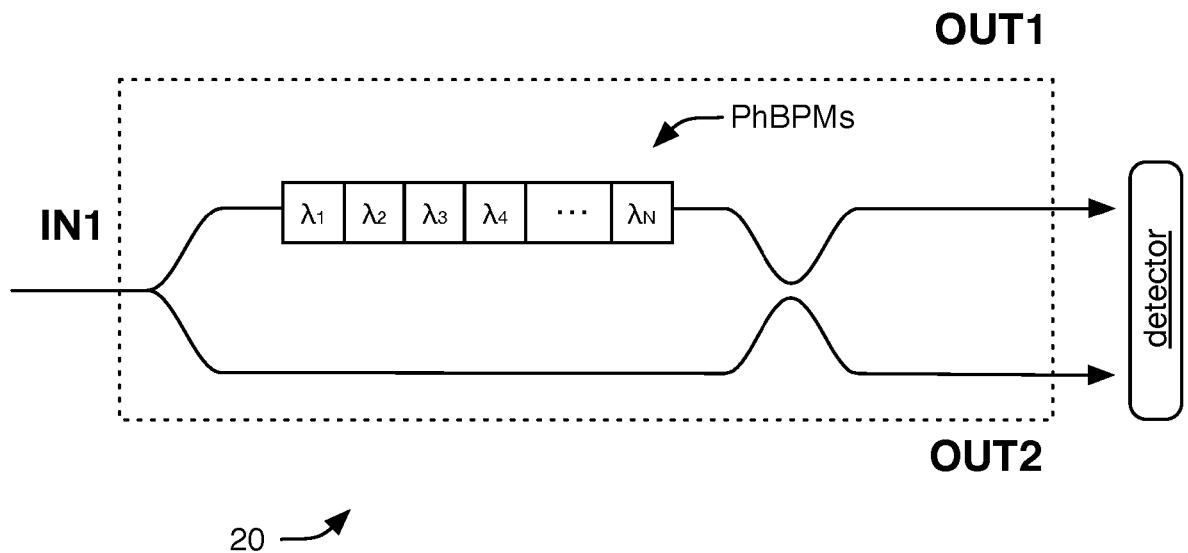
Figure 5D:
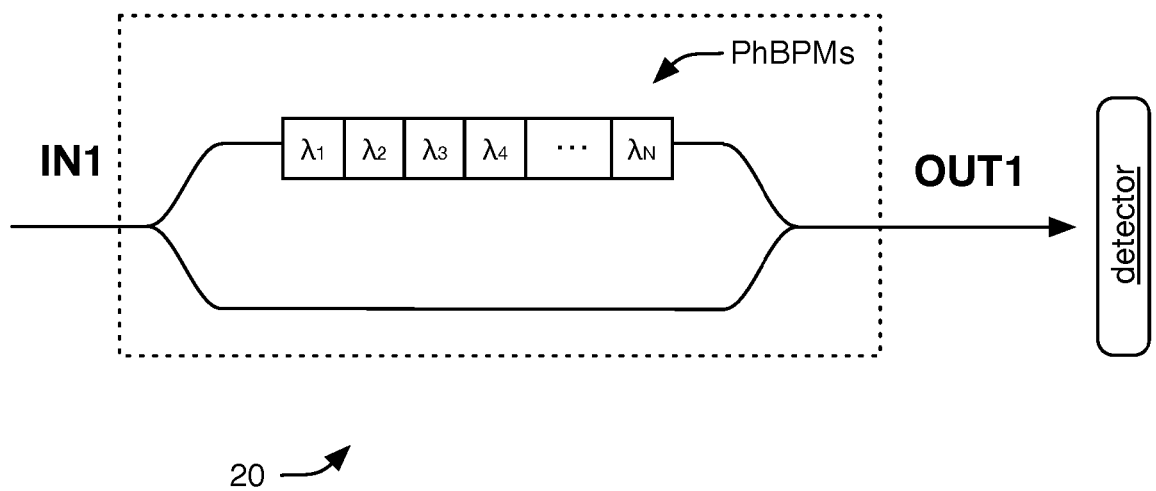

Each detector preferably functions to transduce an optical signal (e.g., into an electrical signal). The computation module preferably includes one detector (e.g., summation detector) associated with each spectral filter bank. However, the computation module can alternatively combine signals from multiple spectral filter banks, wherein the combined signal is input to a single detector. The detectors preferably include one or more photodetectors (e.g., photodiodes), but can additionally or alternatively include any other suitable detectors. In a first embodiment, each detector includes a pair of photodiodes (e.g., balanced photodetector), such as one each on the THRU and DROP ports of the spectral filter bank (e.g., as shown in FIG. 5A). In a second example, the detector is a single photodiode (e.g., on either the THRU or the DROP port; on a single output port, such as shown by way of example in FIG. 5D; etc.). However, the detector can additionally or alternatively include any other suitable arrangement of photodiodes and/or other detectors. Each detector output and/or derivatives thereof, such as combinations of detector outputs (e.g., sums or differences of multiple detector outputs, such as described by way of example in U.S. Patent Application No. 62/871,337, titled "System and Method for Parallel Photonic Computing" and filed 8 Jul. 2019) is preferably delivered to the control module (e.g., as an electrical signal). However, one or more detector outputs can additionally or alternatively be used to drive one or more transducers (e.g., transducers of the same input module, of another input module, etc.). For example, the detector outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009, 135).

1.2.3 Splitter.

The splitter preferably functions to split a signal (e.g., received from the input module), propagating the split signal along a plurality of paths (e.g., waveguides). The number of paths onto which the signal is split is preferably based on the number of spectral filter banks in the computation module (e.g., one path for each weight bank, two paths for each weight bank, three paths for each weight bank, etc.). The splitting is preferably wavelength-independent; alternatively, different wavelength selective elements can be used to split each channel (or set of multiple channels, such as adjacent channels) independently. The signal is preferably split equally (or substantially equally) between all paths and/or spectral filter banks, but can alternatively be split with any other suitable intensity distribution. The splitter can include one or more splitter elements, such as two-way splitters, star couplers, multi-mode interference (MMI) couplers, inverse design couplers, and/or any other suitable elements. In one example, the splitter is a tree splitter, including a plurality of splitter elements in a tree configuration (e.g., including a plurality of two-way splitters arranged in a binary tree). In some variations, the tree splitter can include elements of one or more of the above types. For example, a plurality of 1×k couplers (i.e., couplers that split a single input into k paths) can be combined in serial layers to provide N outputs.

Figure 3A:
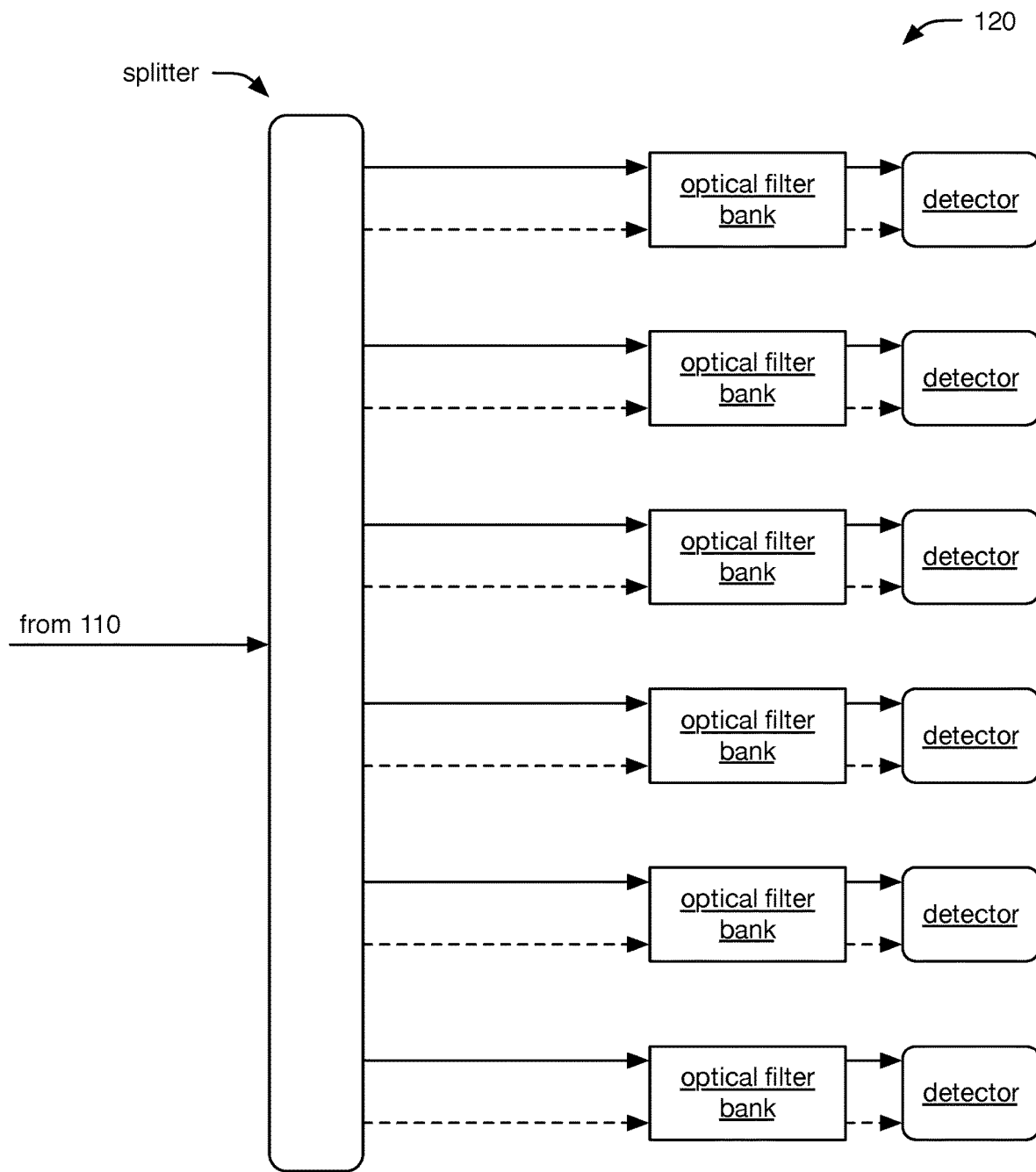
FIG. 3A is a schematic representation of an embodiment of the computation module.
Figure 3B:
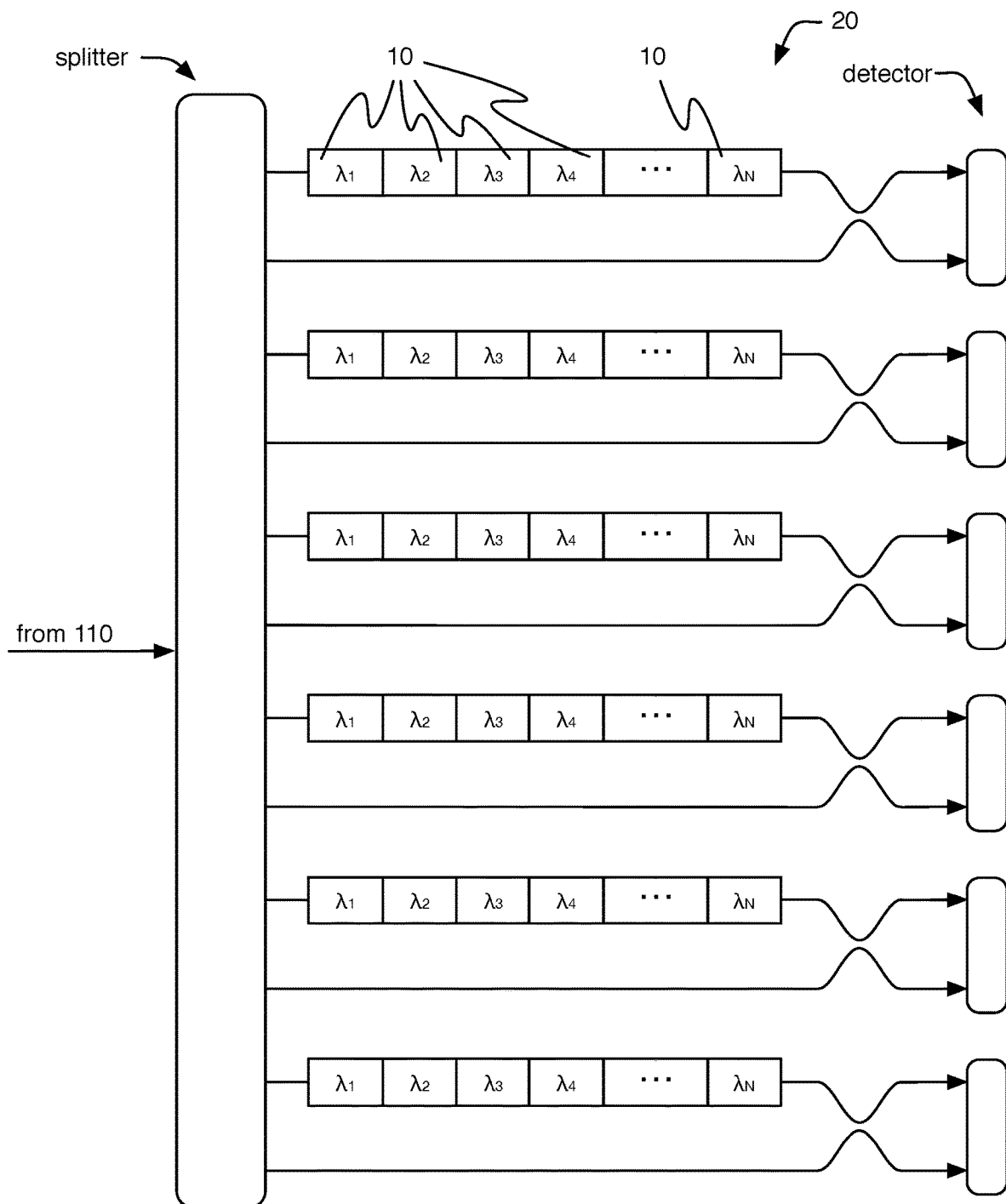
FIGS. 3B-3D are schematic representations of a first, second, and third example, respectively, of the embodiment depicted in FIG. 3A.
Figure 3C:
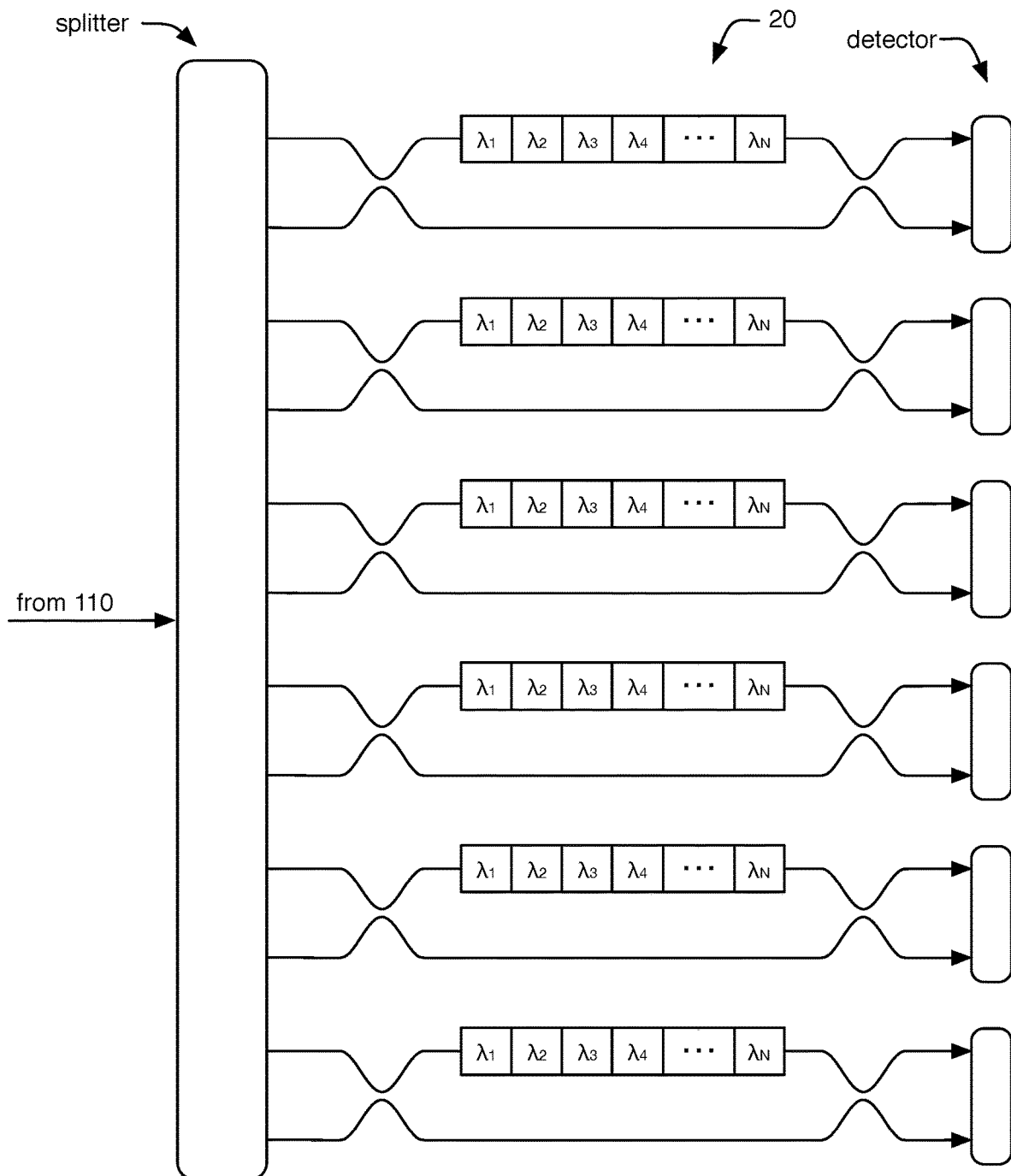
Figure 3D:
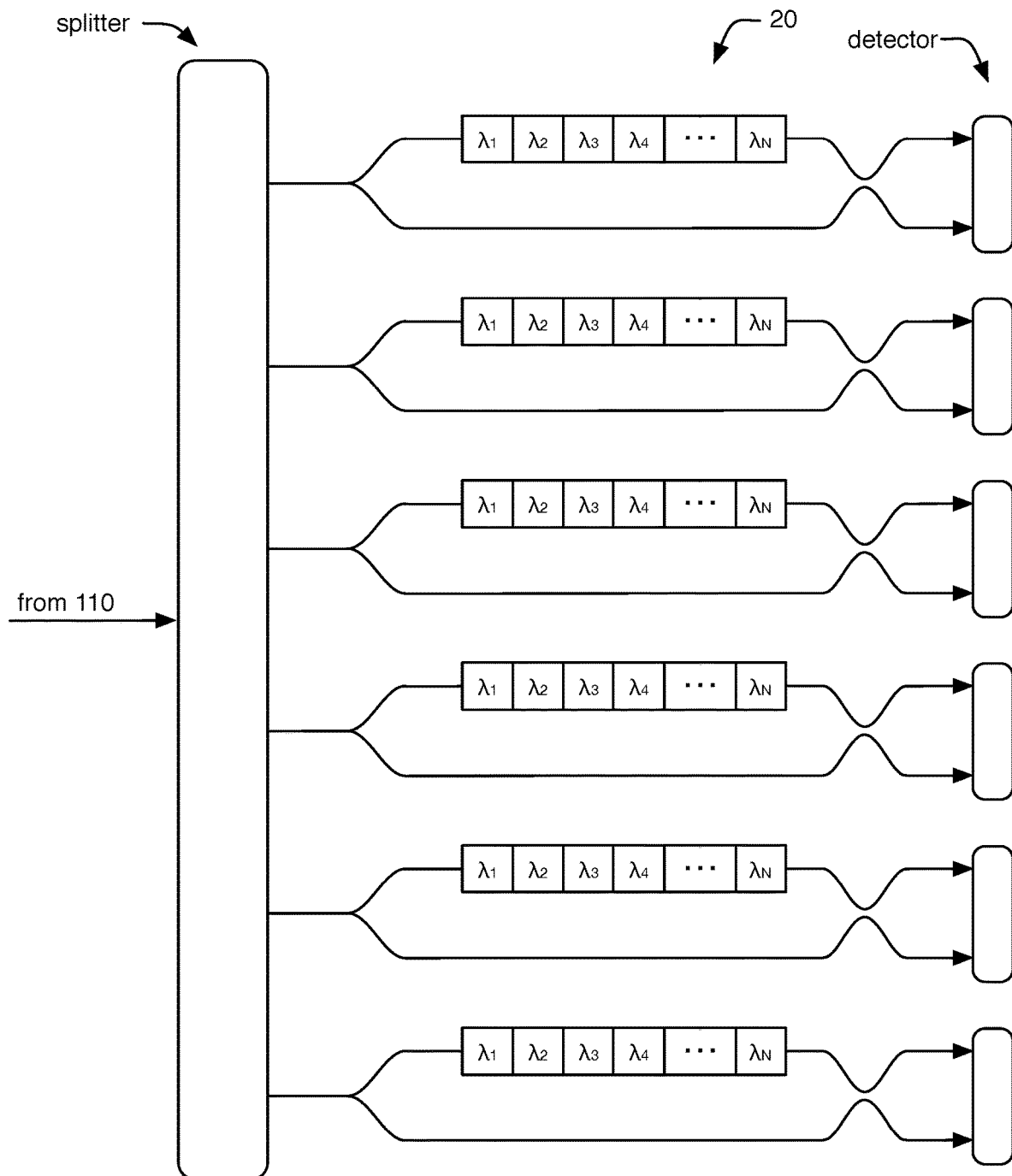

In a first embodiment, the signal from the input module is split directly and propagated to all of the spectral filter banks (e.g., as shown in FIGS. 3B-3D).

Figure 6A:
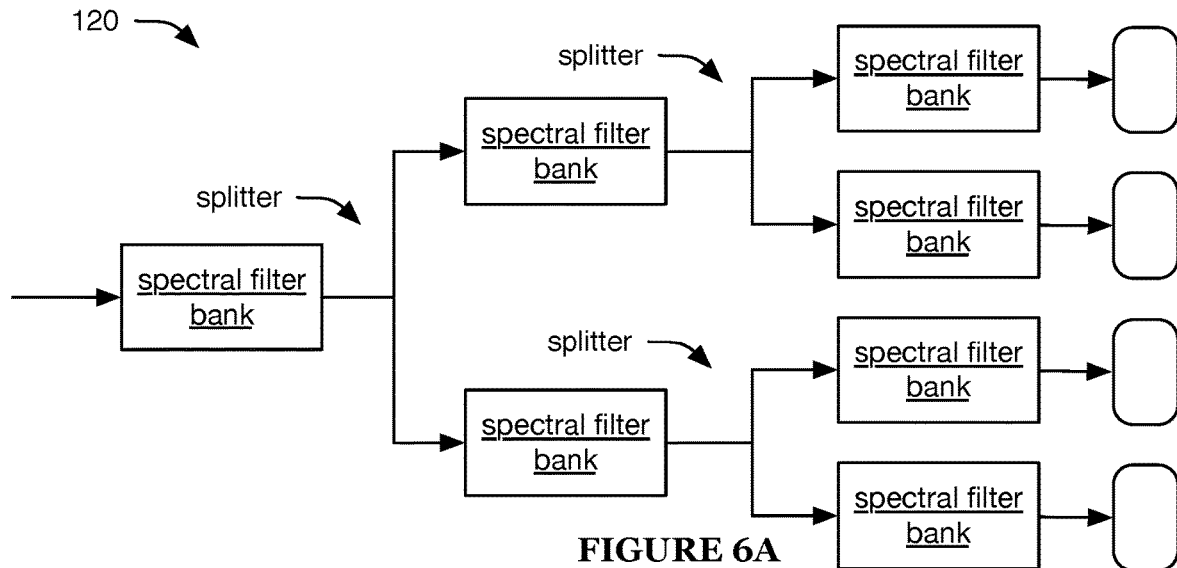
FIGS. 6A-6B are schematic representations of a first alternate embodiment of a portion of the computation module and an example of the first alternate embodiment, respectively.
Figure 6B:
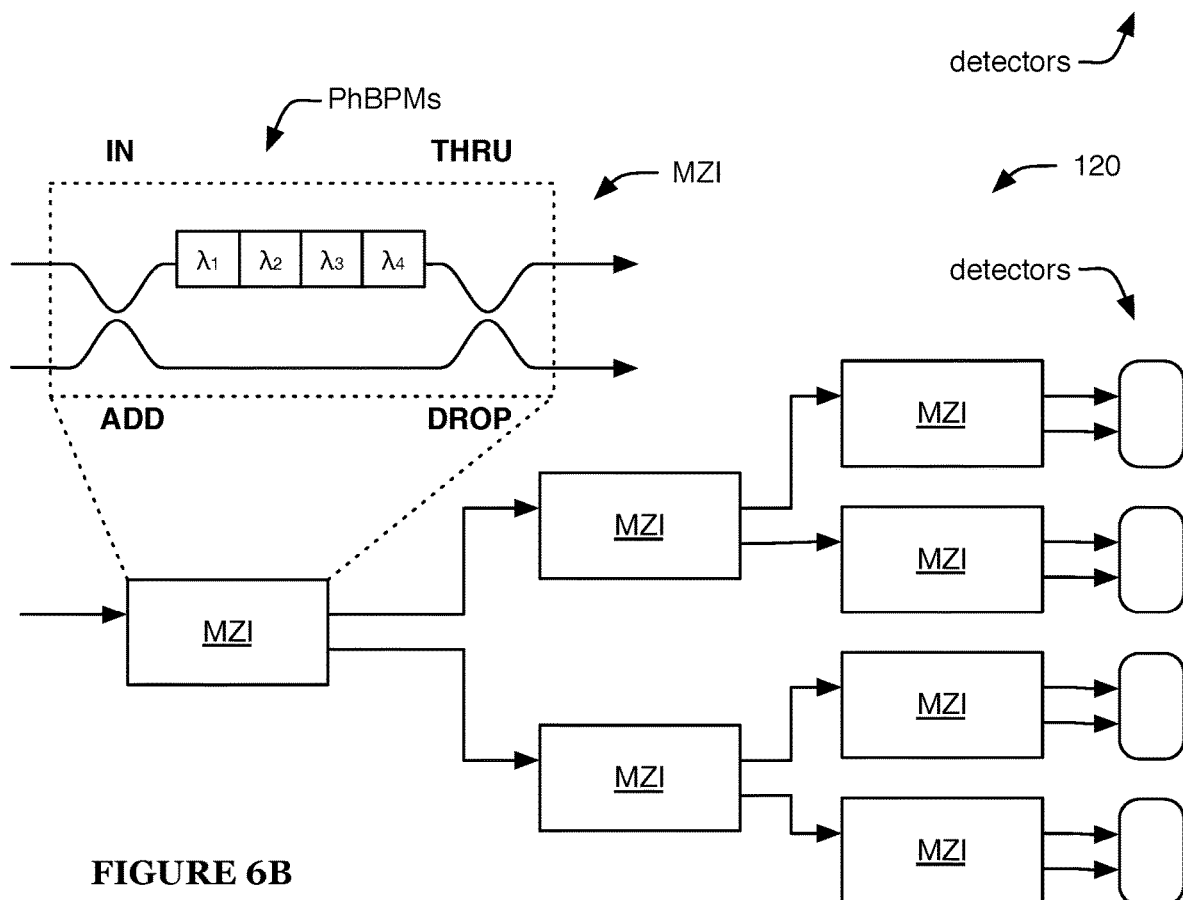

In a second embodiment, splitters are interspersed with (and/or integrated with) spectral filter banks. In this embodiment, the splitter elements and filter banks can be arranged in a tree structure (e.g., binary tree structure, such as shown in FIG. 6A; tree of star couplers, such as described above; etc.). In a specific example, the spectral filter banks (preferably phase weight banks in which each phase modulator element is a PhBPM) are integrated with a set of MZIs (e.g., a spectral filter bank on one path of each MZI), wherein the THRU port of any given MZI is fed to the IN port of a first downstream MZI and the DROP port of the given MZI is fed to the IN port of a second downstream MZI (e.g., as shown in FIG. 6B). In a variation of this embodiment (e.g., in which the input signal includes only a single channel), each MZI includes a single phase modulator element (e.g., associated with the single channel of the input), preferably a PhBPM.

However, the system can additionally or alternatively include any other suitable splitter(s) in any suitable arrangement, or can include no splitter (e.g., wherein the computation module includes a single spectral filter bank and detector which filter the optical input signal). Further, the computation module can additionally or alternatively include any other suitable elements in any suitable arrangement.

1.3 Control Module.

The control module 130 preferably functions to provide (e.g., transmit) inputs (e.g., data) to, receive outputs from, and/or control operation of the other elements of the system. In some examples, the control module 130 includes one or more data submodules (e.g., configured to provide data, preferably input data such as weights and/or input vector values, to the input and/or computation modules) and/or controller submodules (e.g., configured to coordinate operation of the input and/or computation modules, such as coordinating flow and/or execution of data and/or computation instructions, etc.). The control module preferably controls (e.g., provides electrical data signals to) the transducers of the input module and/or the spectral filter banks (e.g., the modulators) of the computation module. The control module preferably receives outputs (e.g., electrical signals) from the detectors, and can additionally or alternatively receive outputs from the optical taps, filter monitors, and/or any other suitable elements of the system. The control of the transducers, filters and/or other elements can optionally be altered based on the received outputs.

The control module can include, for example, one or more one or more processors, preferably electronic processors (e.g., CPU, GPU, microprocessor, FPGA, ASIC, SIMD, coarse-grained reconfigurable array, etc.), storage elements (e.g., RAM, flash, magnetic disk drive, etc.), look up tables, serializers, deserializers, digital to analog converters (e.g., which can function to generate data signals and/or other control signals for the transducers, filters, and/or other controlled elements), analog to digital converters (e.g., which can function to encode the detector output signals), and/or any other suitable elements.

However, the system can additionally or alternatively include any other suitable elements in any suitable arrangement.

2. Photonic Crystal-Based Modulator.

A photonic bandgap phase modulator 10 (e.g., photonic crystal-based modulator) preferably functions to phase-modulate an optical signal based on a control signal. The PhBPM preferably accepts an optical input (e.g., the optical signal) and provides an optical output (e.g., modulated optical output, such as modulated based on the control signal). For example, the PhBPM can include (and/or be integrated into) one or more waveguides (or portions thereof). The waveguide preferably defines a propagation direction (or defines a propagation direction at each position along the waveguide, such as a vector tangent to the path of light through the waveguide). A person of skill in the art will recognize that, although referred to as defining a propagation direction, in some embodiments, the waveguide may optionally support light propagation along the reverse of the propagation direction (e.g., from an output port to an input port) and/or along any other suitable directions; in such embodiments, the propagation direction is understood to be the path along which light propagates during typical operation of the system (e.g., the path along which light propagates in response to being introduced at the input of the waveguide).

The PhBPM is preferably associated with (e.g., configured to modulate) one or more optical channels (e.g., channels such as described above regarding the photonic computing system 100). In one example, each modulator has a bandwidth (of a spectral band that the PhBPM is configured to modulate) in the nanometer or sub-nanometer range (e.g., 0.05, 0.1, 0.15, 0.2, 0.25, 0.5, 1, 2, 3, 5, 0.01-0.03, 0.03-0.1, 0.1-0.3, 0.3-1, 1-3, or 3-10 nm, etc.), such as corresponding to a frequency bandwidth of 25-100 GHz. The modulator may have a free spectral range (FSR) in the tens of nanometers range (e.g., 10, 20, 30, 40, 50, 75, 10-30, 30-50, or 50-100 nm, etc.), have any other suitable FSR, or not define an FSR (e.g., not have periodic spectrum-responsive properties). However, the modulators can additionally or alternatively include narrower spectral aspects, broader spectral aspects, and/or any other suitable properties.

The PhBPM preferably includes a set of photonic crystal segments 11 (e.g., photonic bandgap phase switches). The segments are preferably arranged along the waveguide. The segments are preferably electrically-addressable photonic crystal segments (e.g., wherein the state and/or function of a segment can be altered based on an electrical input). Modulation of the light can be controlled within each segment, preferably independently from the other segments (e.g., based on independent electrical signals provided to each segment). The modulation preferably enables control of the phase of the optical output (for the channel or channels associated with the segment), more preferably having minimal or no modulation effect on the other channels (e.g., all other channels of the optical input). Each segment of the PhBPM is preferably associated with (e.g., configured to modulate) the same channel or channels (e.g., all channels associated with the PhBPM. However, in alternate embodiments, one or more segments of a PhBPM may be associated with (e.g., configured to modulate) different channels than other segments of the PhBPM.

In one embodiment of a PhBPM, each photonic crystal segment of the PhBPM can be controlled to transition between two or more photonic bands (e.g., as described in Alperen Govdeli, Murat Can Sarihan, Utku Karaca, and Serdar Kocaman, "Integrated Optical Modulator Based on Transition between Photonic Bands," *Sci. Rep.* 8:1619 (2018), and/or in Kocaman, S., Aras, M., Hsieh, P. et al., "Zero phase delay in negative-refractive-index photonic crystal superlattices," *Nature Photon*, 5, 499-505 (2011), each of which is hereby incorporated in its entirety by this reference; as in one or more variations on the approaches described in Govdeli et al. and/or in Kocaman et al., such as variations in which reverse bias, rather than (or in addition to) forward bias, is used to control transitions between the photonic bands; etc.). For example, each photonic crystal segment can be operable to transition (e.g., independent from the other photonic crystal segments) between a first mode, in which light of a particular wavelength band propagates through the segment in a first photonic band defining a first effective index of refraction (e.g., positive index of refraction), and a second mode, in which light of the wavelength band propagates through the segment in a second photonic band defining a second effective index of refraction (e.g., negative index of refraction), preferably substantially different from the first effective index of refraction.

The transition (e.g., band-to-band transition) preferably only occurs for the optical channel or channels associated with the segment (e.g., wherein for the other optical channels, no or substantially no change in photonic band and/or other optical properties occurs due to the transition); for example, a transition between a first and second photonic band can occur for a particular wavelength range, wherein wavelengths shorter than the range remain in the first photonic band, wavelengths longer than the range remain in the second photonic band, and only wavelengths within the range transition between the photonic bands. The channels can have a channel width of approximately 0.1, 0.2, 0.5, 1, 2, 5, 10, 20, 0.1-1, 1-5, and/or 5-20 nm, but can additionally or alternatively be greater than 20 nm, less than 0.1 nm, and/or have any other suitable channel width.

The transition preferably results in a refractive index change (e.g., for light of the associated channels, preferably without substantially changing the refractive index for light of other channels, or changing the refractive index to a much lesser degree for light of other channels, such as a change smaller by a factor of 5, 10, 20, 50, 100, 5-25, 20-100, or more than 100, etc.). The difference between refractive indices of the two photonic bands is preferably large, such as a large absolute change (e.g., 0.5, 1, 1.5, 2, 2.5, 3, 4, 5, 0.5-1, 1-2, 2-3, 3-6, etc.) and/or a large relative change (e.g., 20%, 30%, 50%, 75%, 100%, 150%, 200%, 250%, 10-30%, 30-60%, 60-100%, 100-200%, or 200-300% of the magnitude of one or both of the indices, etc.). More preferably, the transition involves a change in sign of the effective refractive index (e.g., wherein the first photonic band defines a positive index, and the second photonic band defines a negative index).

In some examples of this embodiment, there is little or no difference between the absolute values of the refractive indices (of the photonic bands that light transitions between), which can minimize reflections at interfaces between the photonic crystal segments. Accordingly, in these examples, one index can be positive and the other negative (e.g., +1.5 and −1.5; +1.41 and −1.25; between +1 and +3, and between −3 and 0; etc.) A person of skill in the art will recognize that the refractive index here refers to the effective refractive index, defined as phase delay per unit length in the waveguide relative to the phase delay per unit length in vacuum.

In this embodiment, the transition preferably occurs in response to an electrical input. The input is preferably an applied voltage, such as a standard integrated circuit supply voltage (e.g., 0.5, 0.6, 0.65, 0.7, 0.75, 0.8, 0.9, 1, 0.4-0.6, 0.6-0.75, or 0.75-1 V, etc.). For example, the photonic band transition can occur due to carrier injection, carrier depletion, plasma dispersion effect, Pockels effect, and/or ferromagnetic fluid spin realignment in the photonic crystal. In some examples, reverse bias is used to control transitions between the photonic bands. For example, the segment can be maintained in a first mode (e.g., wherein light of the relevant wavelength range propagates in a first photonic band) by applying and/or maintaining a first bias (e.g., substantially zero bias, such as between +0.1 V and −0.1 V; small reverse bias, such as between 0 V and −0.4 V and/or, in examples including a p-i-n junction, lesser in magnitude than a "swept out" voltage required to substantially sweep out charge carriers from the intrinsic region of the junction; forward bias, preferably a small forward bias such as a bias less than +0.25 V, but additionally or alternatively any other suitable forward bias; etc.) across one or more semiconductor junctions of the segment, or by not applying an electrical input; and can be maintained in a second mode (e.g., wherein light of the relevant wavelength range propagates in a second photonic band) by applying (and preferably maintaining) a reverse bias (e.g., −0.4 V, −0.5 V, −0.6 V, −0.7 V, −1 V, between 0 V and −0.4 V, between −0.4 V and −0.7 V, and/or greater in magnitude than −0.7 V, etc.) across one or more of the semiconductor junctions of the segment. In a specific example, the segment is maintained in the first mode by maintaining substantially zero bias across the semiconductor junction(s), and is maintained in the second mode by maintaining a reverse bias across the semiconductor junction(s) substantially equal to −0.7 V. However, the transitions between photonic bands (e.g., between segment modes) can additionally or alternatively be controlled in any other suitable manner.

Figure 9A:
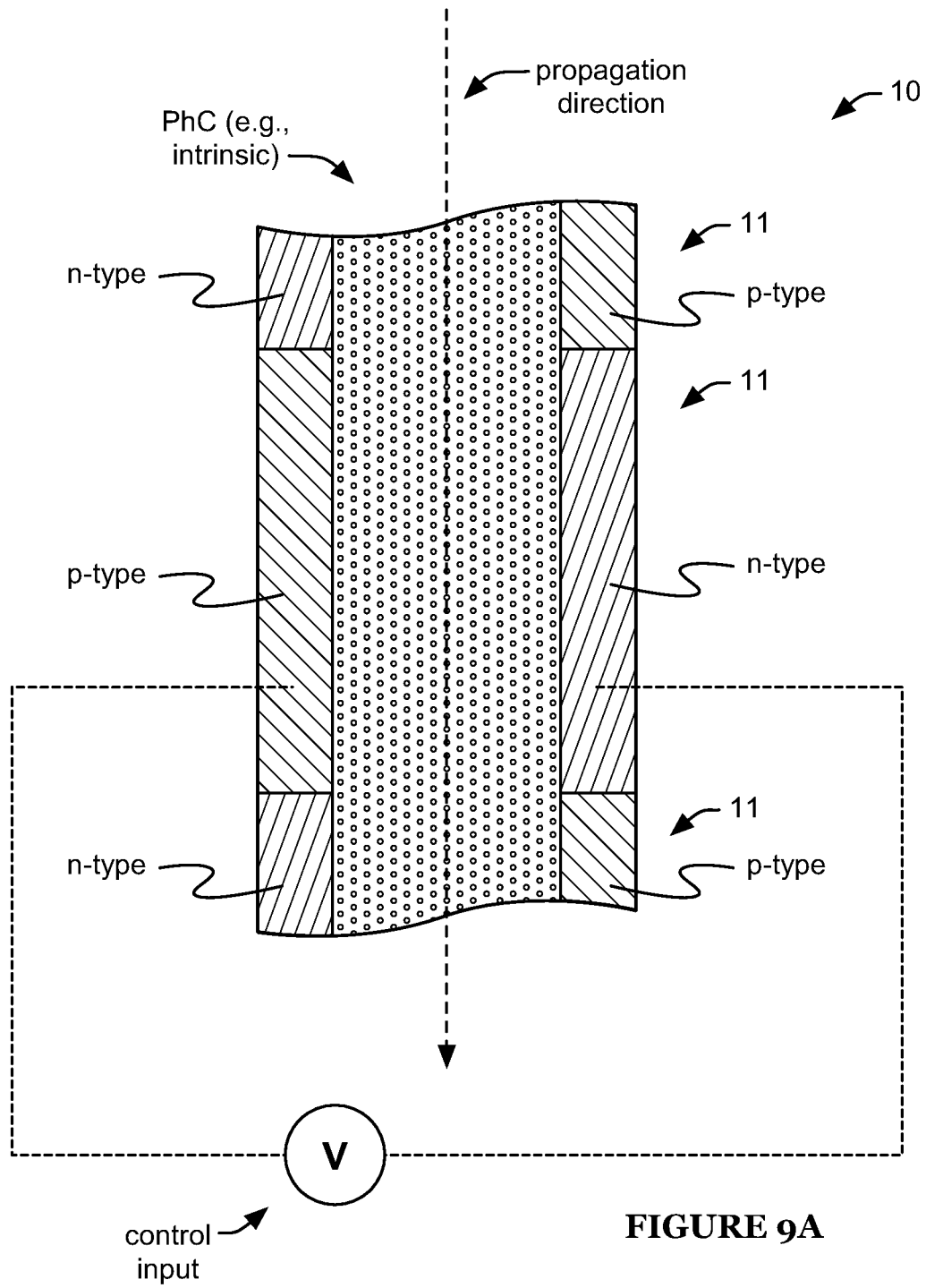
FIGS. 9A-9C are schematic representations of a first, second, and third example, respectively, of lateral junction segments of a photonic bandgap phase modulator.
Figure 9B:
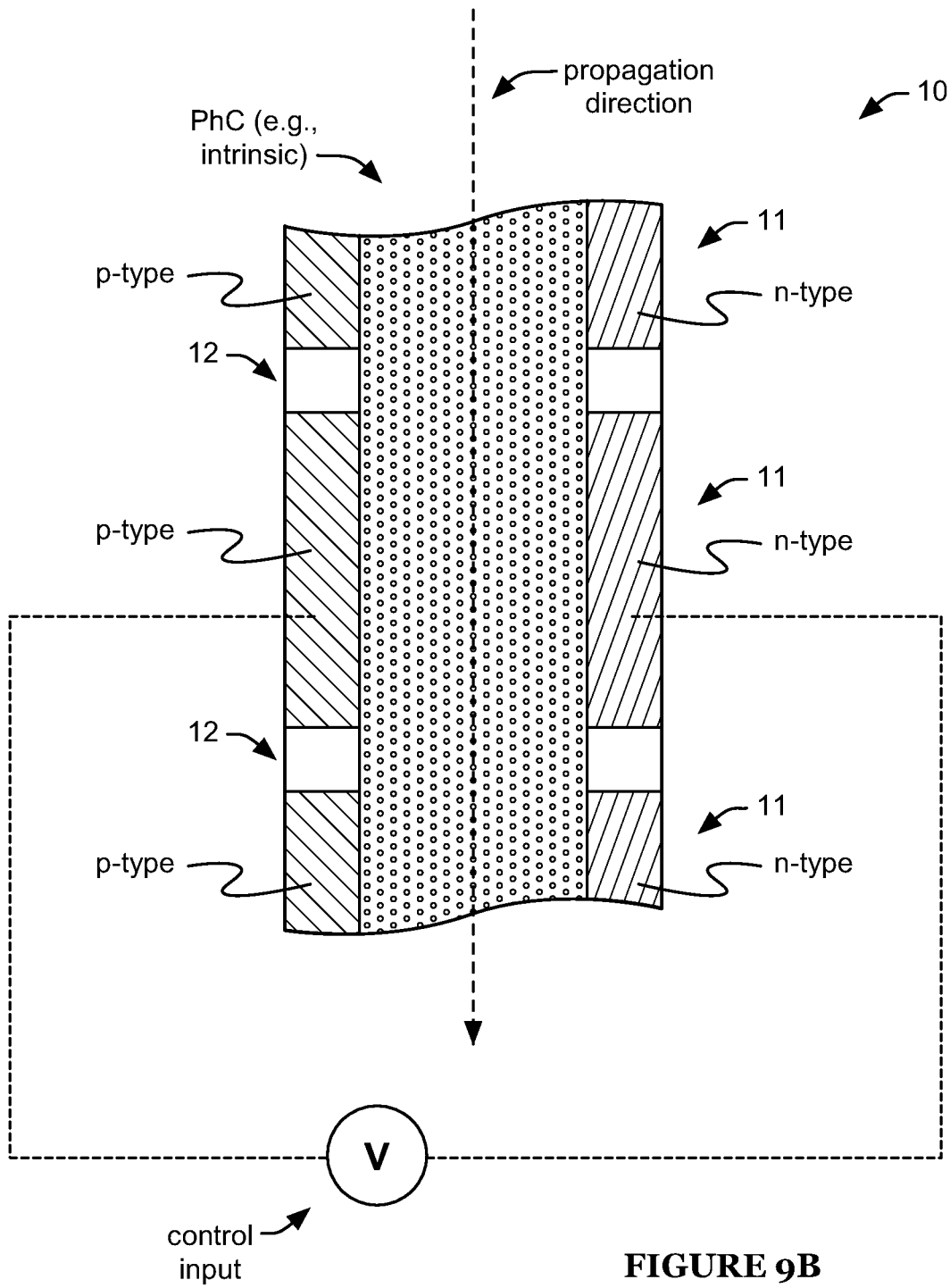
Figure 9C:
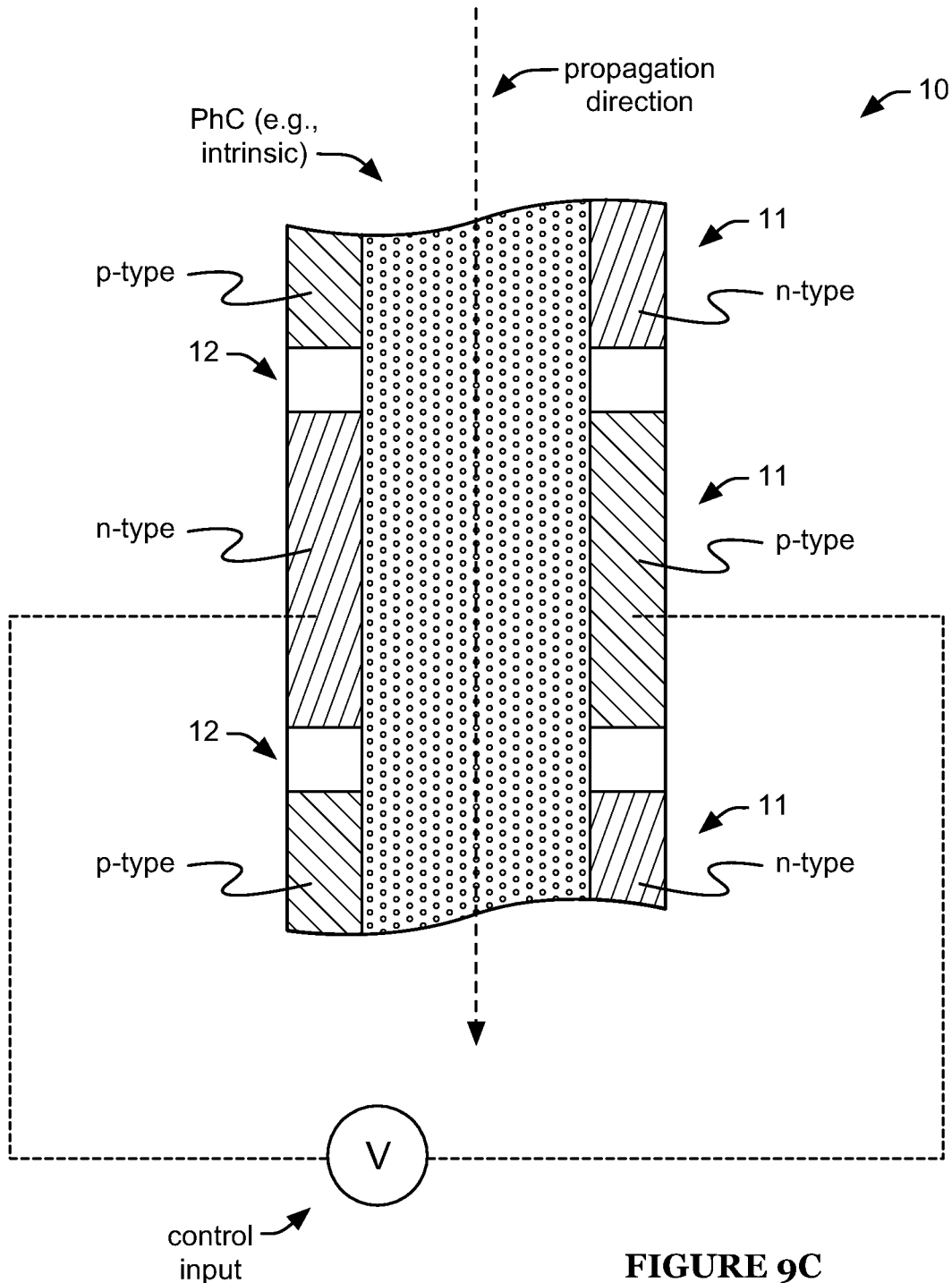

In this embodiment, the segment preferably includes one or more semiconductor junctions across, within, and/or near the photonic crystal (e.g., as shown in FIGS. 9A-9C and/or 10A-10B). These junctions can include p-i-n junctions (e.g., with an intrinsic photonic crystal, with both doped and intrinsic regions of the photonic crystal, etc.), p-n junctions (e.g., wherein the junction is entirely within the photonic crystal, wherein the junction spans the photonic crystal, etc.), and/or any other suitable semiconductor doping profiles. The n- and/or p-type regions can be highly doped, degenerately doped, lightly doped, and/or have any other suitable amount of doping (e.g., can be doped to a carrier density of $10^{15}$, $10^{16}$, $10^{17}$, $10^{18}$, $10^{19}$, $10^{20}$, $10^{13}$-$10^{17}$, $10^{17}$-$5\times10^{19}$, $10^{17}$-$10^{18}$, $10^{18}$-$10^{19}$, or $10^{19}$-$10^{20}$ carriers per cubic centimeter, etc.; in a specific example, approximately $10^{18}$, such as between $3\times10^{17}$ and $3\times10^{18}$; etc.). The junctions can be arranged parallel to the waveguide propagation direction, perpendicular to the propagation direction, at an oblique angle to the propagation direction, and/or have any other suitable arrangements.

In a first example of this embodiment, the segment includes a lateral junction, such as wherein the junction is substantially parallel to and/or defined along the propagation direction. In this example, the segment preferably includes two electrical leads: one contacting the n-type region and the other contacting the p-type region (e.g., as shown in FIGS. 9A-9C).

Figure 10A:
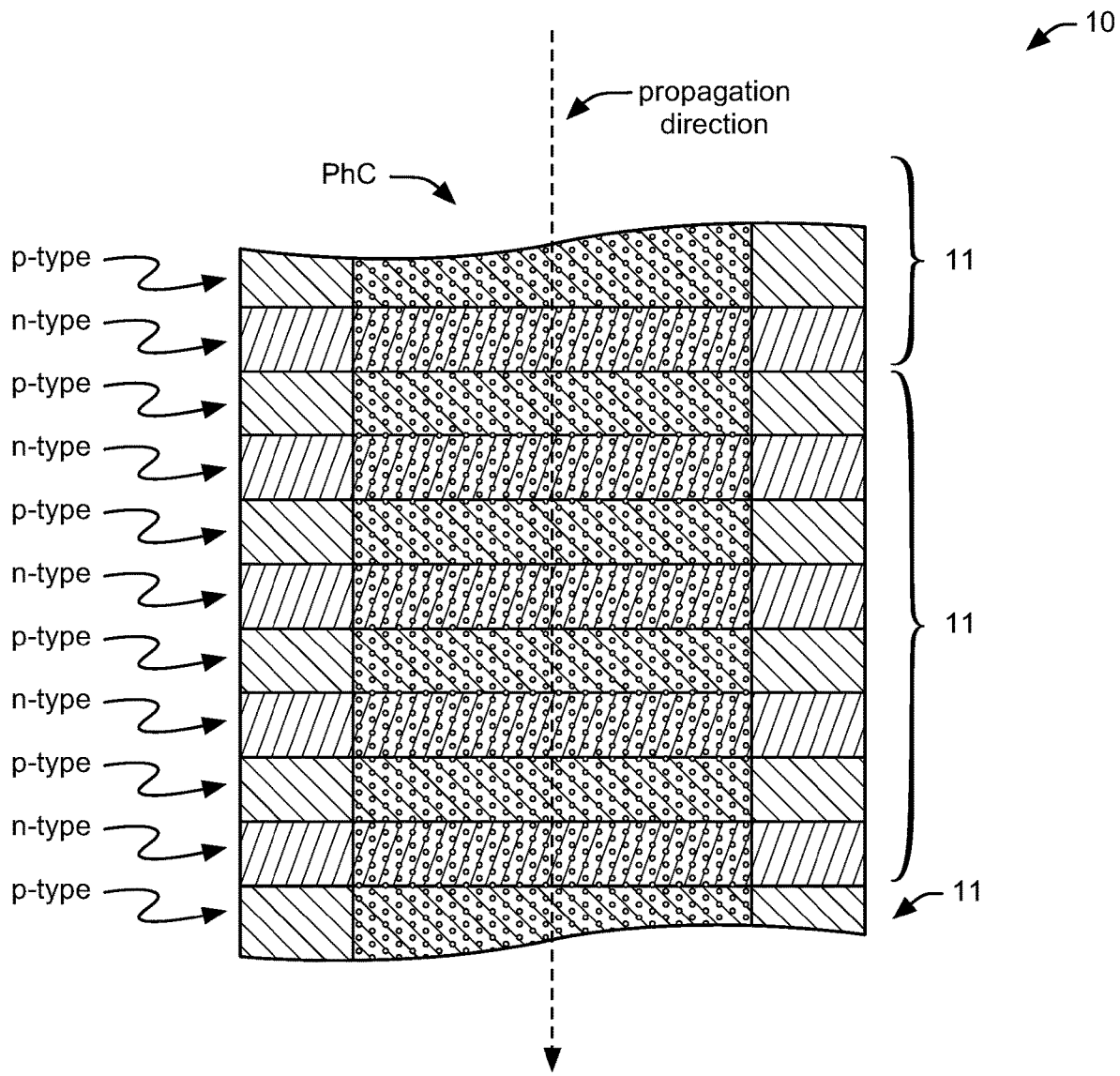
FIGS. 10A-10B are schematic representations of an example of interleaved junction segments of a photonic bandgap phase modulator, with electrical leads to one segment omitted and included, respectively.
Figure 10B:
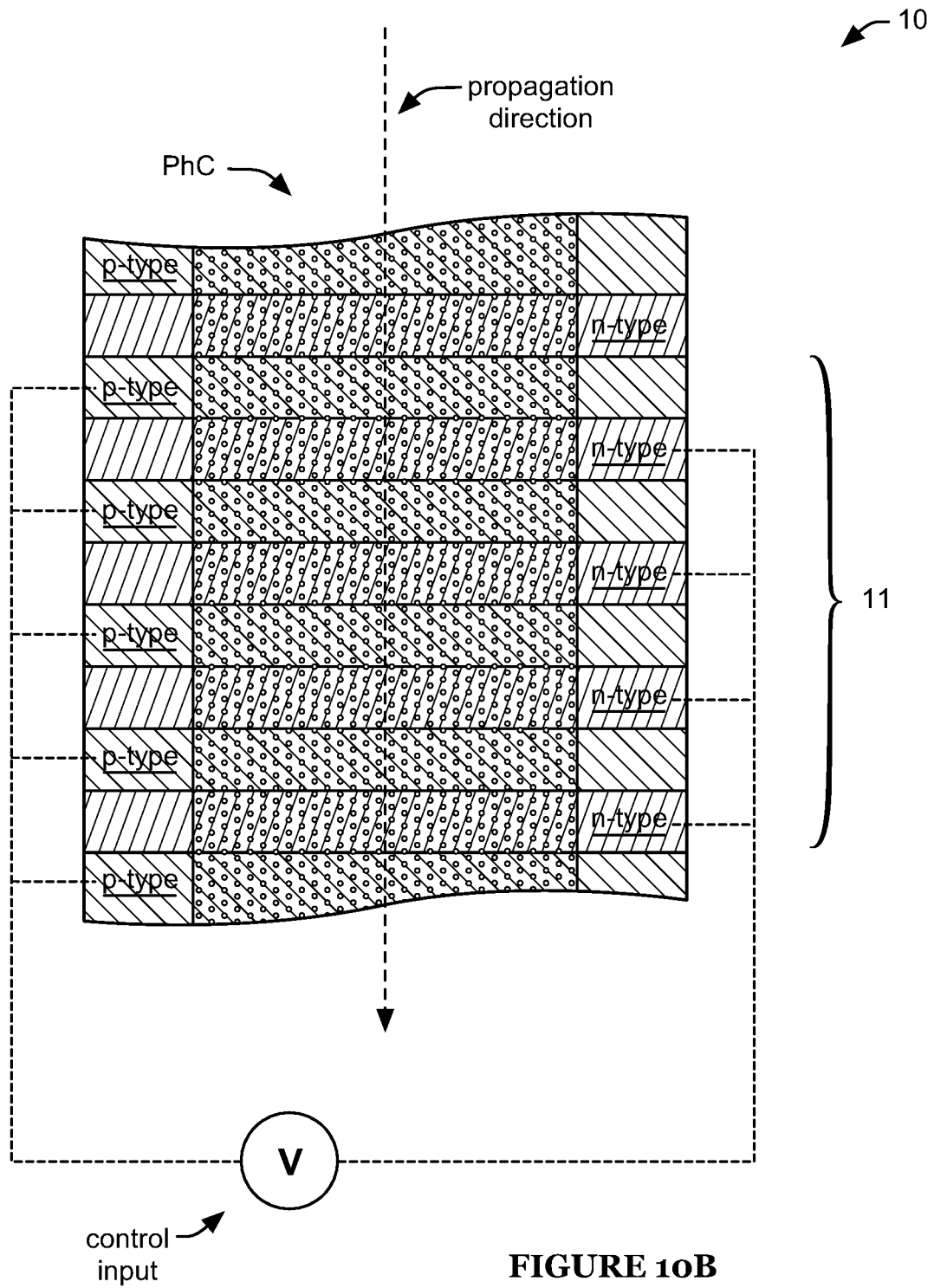

In a second example of this embodiment, the segment defines an interleaved structure. The interleaved structure preferably includes a plurality of semiconductor junctions (e.g., substantially normal to the propagation direction) formed by alternating n- and p-type regions (e.g., as shown in FIG. 10A). In specific examples, these n- and p-type regions can define substantially equal or non-equal lengths (e.g., lengths along the propagation direction), such as regions with lengths of 50, 100, 200, 300, 500, 25-75, 75-125, 125-200, 200-400, and/or 400-1000 nm. The interleaved structure preferably includes only two electrical leads: one contacting all the n-type regions and the other contacting all the p-type regions (e.g., as shown in FIG. 10B). Alternatively, the interleaved structure can include a separate lead to each doping region, to subsets of the regions (e.g., wherein each lead only contacts regions of a single doping type), and/or include any other suitable leads.

In some examples of this embodiment, one or more elements of the PhBPM (e.g., photonic crystal segments) includes elements such as described in Alperen Govdeli, Murat Can Sarihan, Utku Karaca, and Serdar Kocaman, "Integrated Optical Modulator Based on Transition between Photonic Bands," *Sci. Rep.* 8:1619 (2018), and/or in Kocaman, S., Aras, M., Hsieh, P. et al., "Zero phase delay in negative-refractive-index photonic crystal superlattices," *Nature Photon*, 5, 499-505 (2011), each of which is hereby incorporated in its entirety by this reference. In a specific example, a photonic crystal segment includes a two-dimensional hexagonal lattice of air-holes in a silicon-on-insulator platform. In this specific example, the thickness of the silicon slab can be substantially equal to 0.6a and/or the radius of the holes can be substantially equal to 0.3a (e.g., between 0.25a and 0.35a, between 0.28a and 0.30a, such as substantially equal to 0.292a, etc.), wherein a is determined based on the wavelength λ of the associated channel (e.g., a wavelength within the channel, preferably the central wavelength of the channel) as a=0.322λ, wherein $\lambda=\lambda_0/n_{\mathit{eff}}$ represents the effective wavelength in the substrate (i.e., wherein $\lambda_0$ represents the wavelength in free space and $n_{\mathit{eff}}$ represents the effective refractive index of the substrate, such as the effective refractive index when the semiconductor is substantially unbiased). In this specific example, different PhBPMs (e.g., of an optical filter bank) can each define such a structure, with the slab, air-hole, and/or lattice dimensions of each PhBPM determined according to the wavelength of the respective associated channel. In some variations, one or more of the segment(s) can be chirped photonic crystal segments, such as described above (e.g., wherein one or more size metrics of the holes, such as the length, width, radius, area, and/or volume of the holes, is varied along the length of the segment, such as changing gradually over the length of the segment, preferably in a monotonic manner).

In some variations, one or more of the segment(s) can be chirped photonic crystal segments (e.g., wherein one or more aspects of the photonic crystal, such as the air fill fraction, is varied along the length of the segment or a portion thereof), which can reduce light reflection between segments. The air fill fraction is preferably varied by varying one or more size metrics of the air holes, such as length (e.g., width, side length, radius, etc.), area, and/or volume, but can additionally or alternatively be varied by varying the air-hole spacing and/or any other suitable aspects. However, any other suitable aspects of the photonic crystal can additionally or alternatively be varied. In such variations, the aspect (or aspects) preferably changes gradually over the length of the segment, more preferably in a monotonic (or substantially monotonic) manner. In embodiments wherein the aspect(s) only varies within some portions of the photonic crystal, within a photonic crystal region bridging a first segment, in which the aspect has a first value, and a second segment, in which the aspect has a second value, (e.g., a region abutting the first and second segments, wherein the first and second segments oppose one another across the region, along the light propagation path), the aspect(s) preferably varies (e.g., monotonically or substantially monotonically) from the first value (proximal the first segment) to the second value (proximal the second segment). In examples, the aspect(s) can vary substantially based on a function such as a linear function, smoothed linear function (e.g., non-linear near regions in which the aspect is non-varying), polynomial (e.g., cubic) function, sigmoid (e.g., logistic) function, and/or any other suitable function.

However, the segments can additionally or alternatively include any other suitable lattices, lattice features, and/or other elements.

The photonic crystal segment can additionally or alternatively modulate the phase of the light by changing the refractive index of the material in any other suitable way, and/or can achieve the phase modulation by any other suitable mechanism.

The PhBPM preferably includes one or more continuous photonic crystals that include multiple segments of the PhBPM, more preferably wherein all the segments lie within a single photonic crystal, which can function to avoid and/or minimize reflections between the segments (e.g., as compared with examples in which each segment is within a separate photonic crystal). The segments can be directly adjacent the neighboring segments (along the light propagation path), can be separated (along the light propagation path) from neighboring segments (e.g., by portions of the photonic crystal that are not configured to perform phase modulation, by non-photonic crystal waveguide regions, by free space, etc.), and/or can have any other suitable arrangements. For each segment, all portions of the segment are preferably substantially contiguous (e.g., wherein the doped regions of a single segment define a substantially contiguous spatial region); however, portions (e.g., doped regions) of different segments can alternatively be interleaved and/or have any other suitable arrangement.

In some examples, the photonic crystal includes isolation regions 12 between the segments 11. In examples in which the segments include a lateral junction, the regions of the same doping type preferably alternate sides between segments (e.g., as shown in FIG. 9A), which can function to minimize current flow between segments (e.g., due to the depletion region between the adjacent regions of opposite doping), but can alternatively be on the same side of the photonic crystal for all segments or have any other suitable arrangement. In examples in which neighboring segments have regions of the same doping on the same side, the photonic crystal preferably includes an isolation region between each segment (e.g., as shown in FIGS. 9B-9C), which can minimize electrical leakage and/or interference between the segments. The isolation regions can include, for example, air gaps, insulating materials such as oxides, and/or any other suitable materials. In some examples, the isolation regions implement structures such as diffusion isolation structures, oxide insulation structures, LOCOS structures, trench isolation structures, and/or any other suitable isolation structures. In a specific example, each isolation region implements a shallow trench isolation structure, such as a structure with a narrow oxide layer (e.g., oxide layer with a width of 20, 30, 40, 50, 60, 70, 80, 90, 100, 10-35, 35-65, 65-100, 100-250, or 250-500 nm, etc.) between adjacent segments.

The entire PhBPM is preferably associated with a total phase shift $\phi_{max}$. $\phi_{max}$ is preferably equal to (or substantially equal to, such as within 10% of) $\pi$ radians (optionally, modulo $2\pi$), but can alternatively be equal (or substantially equal) to $2\pi$ radians (optionally, modulo $2\pi$) or have any other suitable value. The difference in the phase shift achieved between a state in which all photonic crystal segments of the PhBPM are off versus a state in which all the segments are on is preferably equal (or substantially equal) to $\phi_{max}$. Thus, the PhBPM can be used to control phase modulation of the associated channels of the signal across a range equal to $\phi_{max}$. A person of skill in the art will recognize that, for some applications (e.g., wherein a phase shift is used to encode information in a substantially constant light wave, wherein a phase shift is used to control interference with another light wave, etc.), the effect achieved by phase shifts may be unchanged or substantially unchanged by additional phase shifts of integer multiples of $\pi$ or $2\pi$. Accordingly, in some embodiments, one or more of the phase shifts specified herein with respect to the system 100 and/or method 200 can optionally be modified by addition or subtraction of integer multiples of $\pi$ or $2\pi$ (e.g., one or more phase shift values can be considered to be specified modulo $\pi$ or $2\pi$).

The overall length of the PhBPM can be in the micron range (e.g., 1, 2, 5, 10, 20, 50, 0.3-1, 1-3, 3-10, 10-30, or 30-100 μm, etc.), but can alternatively have a length less than 1 μm, have a greater length, and/or have any other suitable length. Each segment of the PhBPM can have the same or different lengths as each other. Preferably, the semiconductor junction area of each segment is substantially proportional to the segment's length (wherein the length of a segment is preferably defined as the length of the light propagation path through the segment). Thus, for an interleaved structure, the number of doping regions in a segment can be substantially proportional to the segment length (e.g., wherein all doping regions have substantially the same length).

The PhBPM can accept a digital electrical input (control signal). The control signal can be a binary control signal, unary control signal (e.g., thermometer code), and/or any other suitable digital signal. Each digit of the control signal is preferably provided (e.g., provided concurrently) to a different segment of the PhBPM. In one example, the PhBPM includes (or is coupled to, such as accepting input from) an electronic deserializer, which can convert a serial digital signal (e.g., provided on a single electrical line) into a plurality of parallel digital inputs (e.g., wherein each input of the plurality is provided concurrently to a different segment of the PhBPM). In a second example, the digital signal is provided to the PhBPM as a plurality of parallel inputs. In a third example, the PhBPM includes (or is coupled to, such as accepting input from) an analog-to-digital converter (ADC), and the PhBPM (and/or the associated ADC) accepts an analog input (e.g., analog electrical input, analog optical input, etc.). However, the PhBPM can additionally or alternatively include and/or be coupled to any other suitable signal conversion elements.

Figure 11A:
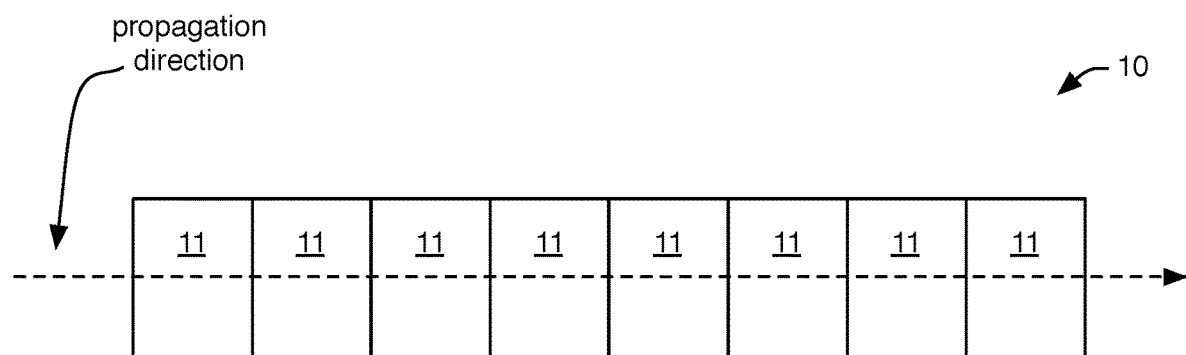
FIGS. 11A-11B are schematic representations of segment lengths of a first and second example, respectively, of a photonic bandgap phase modulator.

In a first embodiment, the PhBPM includes a plurality of substantially equal length segments. In this embodiment, the PhBPM preferably accepts a unary input. In this embodiment, the unary input includes $2^n=N$ unary digits, each provided to one of N segments of the PhBPM, thereby enabling n bits of modulation precision, wherein each segment controls a substantially equal phase shift (substantially equal to $\phi_{max}/N$), such as shown in FIG. 11A.

Figure 11B:
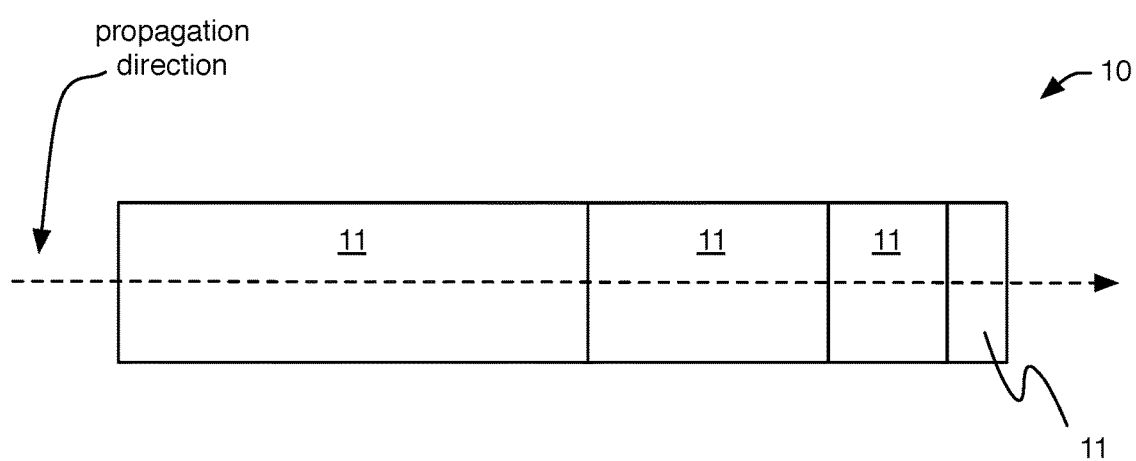

In a second embodiment, the PhBPM includes a plurality of segments with lengths substantially proportional to successive powers of two (e.g., defining a geometric progression with a common ratio of two). In this embodiment, the PhBPM preferably includes n segments and accepts a binary input of n bits, wherein each of the n bits is provided to a different segment of the PhBPM, thereby enabling n bits of modulation precision. In this embodiment, the least significant bit of the input controls the shortest photonic crystal segment, the most significant bit controls the longest photonic crystal segment, and the intermediate bits control the intermediate length segments (wherein bits of greater significance control longer segments than bits of lesser significance). In a specific example, the PhBPM includes four photonic crystal segments, thereby enabling four bits of modulation precision, and $\phi_{max}$ is preferably substantially equal to $\pi$ radians (optionally, modulo $\pi$ or $2\pi$). In this specific example, the four segments can be associated with a controllable phase shift of $\pi/16$, $\pi/8$, $\pi/4$, and $\pi/2$, respectively (e.g., as shown in FIG. 11B), resulting in $\phi_{max}=15\pi/16$; can be associated with a controllable phase shift of $\pi/15$, $2\pi/15$, $4\pi/15$, and $8\pi/15$, respectively, resulting in $\phi_{max}=\pi$; or can be associated with any other suitable controllable phase shifts substantially scaling by powers of two. In this specific example, the least significant bit of the input controls the shortest photonic crystal segment, the second least significant bit of the input controls the second shortest photonic crystal segment, the second most significant bit of the input controls the second longest photonic crystal segment, and the most significant bit of the input controls the longest photonic crystal segment. In alternate specific examples, the PhBPM can include six photonic crystal segments (e.g., enabling six bits of precision), eight photonic crystal segments (e.g., enabling eight bits of precision), 16 photonic crystal segments (e.g., enabling 16 bits of precision), and/or any other suitable number of segments. In an alternate variation, the segment lengths can define (or substantially define) any other geometric progression (e.g., having any other suitable common ratio). However, the segments can have any other suitable lengths and/or accept any other suitable digital input signals. Although depicted in FIG. 11B as arranged in order of length (from longest to shortest, along the propagation direction), the segments can be arranged in any suitable order (e.g., arranged from shortest to longest, arranged non-monotonically with respect to length, etc.).

In some variants, $\Delta n$, the change in effective index of refraction achieved by transitioning a photonic crystal segment from one mode to the other (e.g., switching light propagation through the segment from one photonic band to another) can differ between the different photonic crystal segments. In such variants, rather than the segment length l following one of the relationships described above (e.g., substantially equal for all segments, substantially defining a geometric progression such as with a common ratio of two, etc.), the quantity $l\Delta n$ (the product of the segment length and the change in effective index of refraction for the segment) preferably follows one such relationship (e.g., wherein $l\Delta n$ is substantially equal for all segments, wherein $l\Delta n$ substantially defines a geometric progression such as with a common ratio of two, etc.).

In some embodiments, the PhBPM is coupled (e.g., at the photonic crystal element input) to one or more electronic elements, (e.g., ADC, DAC, measurement element such as ammeter, etc.). However, the PhBPM can additionally or alternatively be coupled to any other suitable elements in any suitable arrangement.

In some embodiments, a system (e.g., the photonic computing system 100) can include one or more optical filter banks 20 (e.g., phase weight banks, such as described above in more detail), wherein each optical filter bank 20 includes a set of PhBPMs (e.g., wherein each modulator element of the phase weight bank is a PhBPM). For example, a path of an optical filter bank 20 can include a photonic crystal which includes a plurality of PhBPMs (e.g., each associated with a different channel or set of channels of the input signal). For each PhBPM, all segments (and portions thereof) of the PhBPM are preferably substantially contiguous (e.g., wherein the doped regions and/or segments of a single PhBPM define a substantially contiguous spatial region), such as shown by way of examples in FIGS. 3B and 5; however, segments (and/or portions thereof) of different PhBPMs can alternatively be interleaved (e.g., within an optical filter bank).

In one embodiment of an optical filter bank, the PhBPMs are each associated with substantially non-overlapping spectral regions (e.g., wherein each PhBPM modulates a different channel or set of channels of the input signal, preferably a single channel). However, such an embodiment will typically be limited in the total number of channels it can independently modulate, based on the filter bandwidth of the PhBPMs and the available input spectrum (e.g., limited spectrum width of an input laser source or sources). For example, an optical filter bank of this embodiment with PhBPMs that each have a filter bandwidth of 1 nm and receive a 40 nm wide input spectrum would be limited to no more than $$\frac{40 \text{ nm}}{1 \text{ nm}} = 40$$

independently-modulated channels.

In other embodiments of an optical filter bank, the PhBPMs can be associated with overlapping spectral regions, which can function to enable independent modulation of a far greater number of channels (e.g., an arbitrary number of channels). In such embodiments, some or all of the PhBPMs will each modulate multiple channels, wherein some or all such channels are modulated by more than one of the PhBPMs. In such embodiments, the optical filter bank can be considered to define a set of modulation vectors, one for each PhBPM, wherein each modulation vector is defined by the channels modulated by the associated PhBPM. This set of modulation vectors preferably spans the channel space (more preferably defining a basis of the channel space, but alternatively not being a linearly independent set), the result of which is that arbitrary independent modulation (e.g., between 0 and $\phi_{max}$ or between $-\phi_{max}/2$ and $\phi_{max}/2$, limited in precision by the precision of the PhBPMs) of each channel can be achieved via a linear combination of PhBPM modulation phase shift amounts (optionally, modulo $\pi$ or $2\pi$).

Figure 8B:
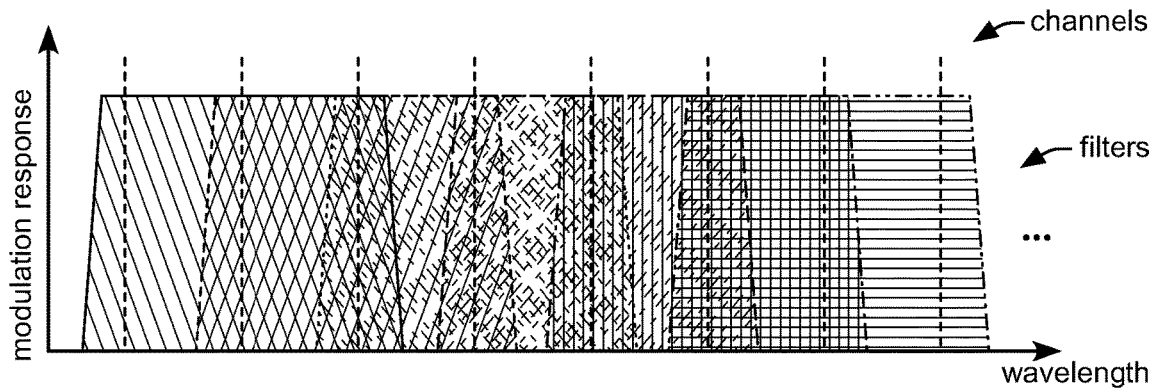
FIG. 8B is a representation of optical channels and filter modulation responses of a second example of the system.
Figure 8C:
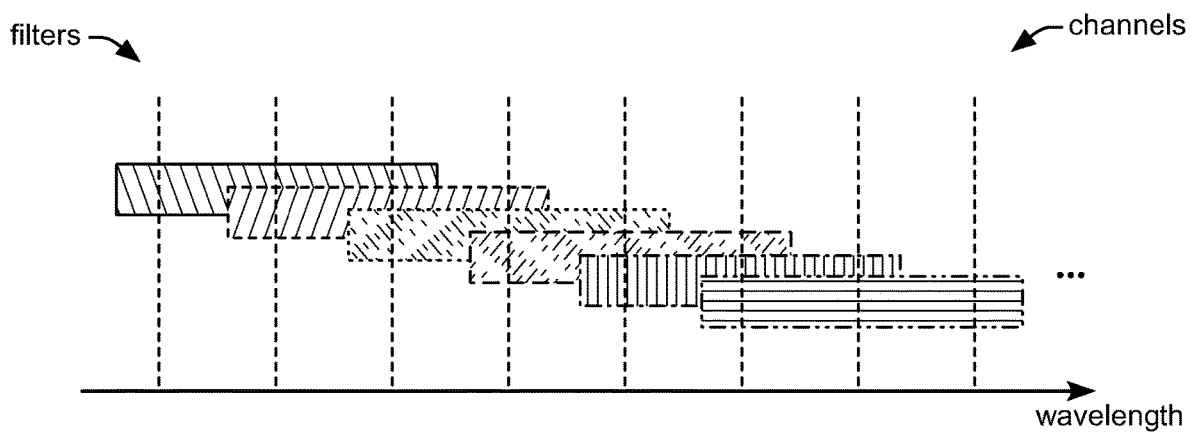
FIG. 8C is a representation of the overlapping filter modulation wavelength ranges of the filters depicted in FIG. 8B.

Preferably, the PhBPMs define substantially evenly-spaced modulation bands of substantially equal bandwidths, the channels are substantially evenly distributed within the spectral range, and the modulation bands and the channels are distributed with substantially equal spacing as each other (e.g., as shown in FIGS. 8B-8C, wherein FIG. 8C depicts the wavelength ranges on which each of the PhBPMs of FIG. 8B act). In such examples, each PhBPM modulates $n_M$ channels (possibly with the exception of some or all of the first and last $n_M$ PhBPMs, ordered by associated spectral range, which may modulate fewer than $n_M$ channels), preferably modulating each of the $n_M$ channels to substantially the same extent (e.g., causing substantially equal phase shifts in all nm channels). For example, PhBPM 1 could modulate channels 1 through $n_M$, PhBPM 2 could modulate channels 2 through $n_M+1$, and so on (generically, the ith PhBPM could modulate channels i through $n_M+i-1$). In a specific example, in which $n_M=3$, PhBPM 1 modulates channels 1-3, PhBPM 2 modulates channels 2-4, PhBPM 3 modulates channels 3-5, PhBPM 4 modulates channels 4-5, and PhBPM 5 modulates channel 5 (alternatively, PhBPM 4 could modulate channels 4, 5, and 1, and PhBPM 5 could modulate channels 5, 1, and 2). In this specific example, the desired phase modulations for channels 1-5 are equal to x, 3x, 3x, 2x, and 0, respectively. Accordingly, PhBPM 1 can be set to cause a phase shift of x, PhBPM 2 can be set to cause a phase shift of 2x, and PhBPMs 3-5 can be set to cause a phase shift of 0.

In some embodiments (e.g., embodiments in which two or more PhBPMs have overlapping modulation bands), it may be preferable to enable the PhBPMs to cause both positive and negative phase shifts (e.g., relative shifts between light of the two paths of an optical filter bank). In a first example, in which one or more PhBPMs are arranged along the first path of an optical filter bank, the optical path length of the second path of the optical filter bank is designed such that a zero phase shift between the paths is achieved (for the channels associated with the PhBPM) when a portion of the segments of the PhBPM (e.g., segments corresponding substantially to a $\phi_{max}/2$ phase shift) are activated. In a second example, an optical filter bank includes one or more pairs of PhBPMs, wherein the PhBPMs of a pair are associated with substantially the same modulation band, the first PhBPM of each pair is arranged along the first path, and the second PhBPM of each pair is arranged along the second path. In this example, PhBPMs arranged along the first path can be used to cause positive phase shifts between light of the two paths, and PhBPMs arranged along the second path can be used to cause negative phase shifts between light of the two paths.

In some embodiments, the use of PhBPMs can enable substantial reductions in modulator dimensions, as compared with typical technologies. For example, typical MZI-based phase modulators exhibit values for the phase modulator figure of merit $V_\pi l$ (representing the voltage $V_\pi$ that must be applied to a phase modulator with an optical path length/in order to achieve a phase shift of $\pi$) in the range of several Volt-millimeters or more. In contrast, some embodiments of PhBPMs may achieve $V_\pi l$ values in the Volt-micron range or less.

However, the PhBPMs 10 and/or optical filter banks 20 can additionally or alternatively include any other suitable elements in any suitable arrangement.

The PhBPM preferably does not rely on (or does not rely solely on; substantially does not rely on; relies on for less than a threshold fraction of the achieved or maximum achievable phase modulation, such as less than 90%, 75%, 50%, 30%, 20%, 10%, 5%, 2%, 1%, 0.1%, etc.) a slow-light enhanced structure (e.g., slow-light enhanced MZI) or other photonic crystal effect aside from the photonic band transition effect described above. However, the PhBPM can additionally or alternatively rely on such other photonic crystal effect.

3. Material Platforms.

The systems described herein (e.g., photonic bandgap phase modulator 10, optical filter bank 20, and/or photonic computing system 100, etc.) can include (e.g., be made of) any suitable materials. The systems (and/or elements thereof, such as some or all of the photonic elements) can be implemented on one or more material platforms, such as photonic integrated circuit platforms (e.g., silicon photonics platforms, monolithically integrated photonics and electronics platforms, other photonic platforms, etc.), microelectronic platforms, and/or any other suitable material platforms. In a first embodiment, the system is implemented as a monolithic platform (e.g., including both photonic elements and electronic elements on a single chip). In a second embodiment, the system is implemented as a heterogeneously integrated platform, such as a platform including two or more chips (e.g., with electronic and/or photonic interfaces between the chips). For example, the heterogeneously integrated platform can include a photonics chip including photonic elements (e.g., and relatively few or no electronic elements, relatively few or no electronic elements with fabrication dimensions below a threshold, etc.; alternatively, including significant electronic elements) and an electronics chip including electronic elements (e.g., and few or no photonic elements; alternatively, including significant photonic elements). In some examples (e.g., of the second embodiment), the system is fabricated via co-integration (e.g., between electronics and photonics), such as wherein different elements of the system can be joined together (e.g., for wafer-to-wafer, die-to-wafer, and/or die-to-die bonding) using one or more packaging technologies such as flip chip bonding, wafer bonding (e.g., direct bond interconnect, hybrid bonding, etc.), through-oxide vias (TOVs), through-silicon vias (TSVs), metal bonding (e.g., eutectic bonding), adhesive bonding, and/or any other suitable bonding interfaces.

In one embodiment, the systems can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAM modulators, etc.). Additionally or alternatively, the systems can include elements implemented in one or more III-V platforms (e.g., JePPiX consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InGaAsP alloys, such as InP or GaAs substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which a elements from a 7 nm electronics platform (e.g., with a 0.6-0.8V limit, such as a 0.65, 0.7, or 0.75 V limit) are coupled with elements from a silicon photonics platform, the silicon photonics platform elements can include transistors (e.g., configured to amplify signals received from the electronics platform elements) operating with voltages in excess of the electronics platform limit.

The systems can additionally or alternatively include elements implemented in a monolithically integrated photonics and electronics platform (e.g., platform typically used for microelectronics) such as a monolithically integrated silicon photonics and electronics platform, preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The systems can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The systems can additionally or alternatively include elements implemented in a silicon nitride photonics platform (e.g., JePPix consortium TriPLEX platform), such as including waveguides defined by silicon nitride within a silicon oxide.

The systems can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The systems can additionally or alternatively include elements implemented in a lithium niobate photonics platform, which can include one or more photonic elements implemented using lithium niobate, such as thin-film lithium niobate.

In a specific example, the systems include elements fabricated such as described in U.S. Pat. No. 8,027,587, issued 27 Sep. 2011 and titled "Integrated Optic Vector-Matrix Multiplier", and/or in U.S. Pat. No. 10,009,135, issued Jun. 26, 2018 and titled "System and Method for Photonic Processing", each of which is hereby incorporated in its entirety by this reference (e.g., elements fabricated as described regarding fabrication on silicon-on-insulator wafers).

A person of skill in the art will recognize that the elements described herein using the term "waveguide" can additionally or alternatively include any other suitable optical paths and/or elements associated with optical paths (including, without limitation, free-space paths and/or paths including free-space segments).

However, the systems can additionally or alternatively be implemented in any other suitable material platform, and can additionally or alternatively include any other suitable materials.

4. Method.

Figure 12:
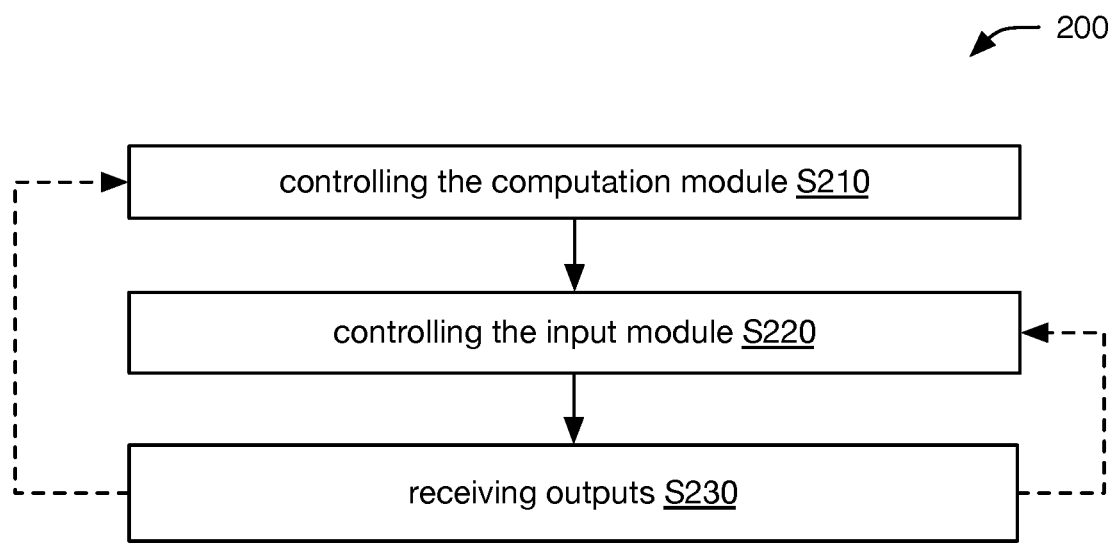
FIG. 12 is a schematic representation of an embodiment of the method.

A method 200 is preferably implemented using the photonic computing system 100 described above (e.g., embodiments of the system 100 that include optical filter banks 20 such as described above), but can additionally or alternatively be implemented using any other suitable systems (e.g., systems that include one or more PhBPMs 10 and/or optical filter banks 20, systems that include other optical filters and/or modulators, etc.). The method preferably includes: controlling the computation module S210; controlling the input module S220; and/or receiving outputs from the computation module S230 (e.g., as shown in FIG. 12).

In some embodiments, the method 200 includes one or more elements such as described in U.S. Pat. No. 8,027,587, issued 27 Sep. 2011 and titled "Integrated Optic Vector-Matrix Multiplier", and/or in U.S. Pat. No. 10,009,135, issued Jun. 26, 2018 and titled "System and Method for Photonic Processing", each of which is hereby incorporated in its entirety by this reference (e.g., using the system 100 described herein to implement elements of the functionality of U.S. Pat. No. 8,027,587, implementing the method of U.S. Pat. No. 10,009,135 using the system 100 described herein, etc.). However, the method can additionally or alternatively include any other suitable elements.

Controlling the computation module S210 preferably includes controlling one or more of the spectral filter banks, more preferably controlling all the spectral filter banks. For example, S210 can include applying control voltages to one or more optical filters (e.g., PhBPMs), thereby controlling the optical filters' interaction with the optical signal (e.g., defining the vector or matrix by which the input vector is multiplied). For example, S210 can include, for each PhBPM, concurrently providing control inputs (e.g., applying control voltages, leaving floating, etc.) to each segment of the PhBPM.

In some embodiments (e.g., in which, for each optical filter bank, the PhBPMs are each associated with substantially non-overlapping spectral bands), S210 can include directly providing a digital signal received from other elements of the system (e.g., elements associated with determining and/or storing desired weight values for the computation) to a PhBPM, optionally after deserializing the digital signal into a plurality of parallel inputs (e.g., as described above regarding the digital electrical input).

In other embodiments (e.g., in which two or more PhBPMs are associated with substantially overlapping spectral bands), S210 can include determining control inputs for each PhBPM of an optical filter bank, preferably based on the set of desired weight values for each channel modulated by the optical filter bank. For example, determining the control inputs can include solving the linear system defined by the PhBPM modulation bands and the desired weight values, thereby determining the desired phase shift associated with each PhBPM, and determining the control inputs based on the desired phase shifts.

However, S210 can additionally or alternatively include controlling the computation module in any other suitable manner.

Controlling the input module S220 preferably includes controlling one or more transducers to emit light (e.g., light encoding an input signal, such as the input vector). The emitted light preferably propagates through the computation module, thereby causing the desired calculation to be performed (e.g., multiplying the input vector by the matrix). In one example, the emitted light interacts with the spectral filter banks, thereby being filtered (e.g., according to the spectral filter weights associated with the matrix), and is then sampled by the detectors generating an output signal.

Receiving outputs from the computation module S230 preferably functions to sample the results of the computation. The outputs are preferably received from the detectors, but can additionally or alternatively be received from any other suitable elements. In a first embodiment, data associated with the received outputs is stored. For example, an analog electrical signal (e.g., signal generated at the detector, signal derived from one or more detector signals, such as described below, etc.) can be converted to a digital signal, optionally transformed into a derived signal (e.g., as described below), and stored in a storage element of the control module (e.g., RAM). Generating a derived signal can include, for example, combining (e.g., adding or subtracting) signals from multiple detectors, applying one or more functions (e.g., nonlinear functions) to the signal(s), and/or any other suitable signal transformations. The derived signals can be generated in the analog domain and/or in the digital domain. In a second embodiment, the received outputs are used to drive one or more transducers (e.g., transducers of the same input module, of another input module, etc.). For example, the received outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009,135). In a third embodiment, the generated and/or derived signal can be re-modulated (e.g., onto a different wavelength) and transmitted into a photonic computing element (e.g., in the same portion of the chip, a different portion of the chip, a different chip, etc.). However, the outputs can additionally or alternatively be received and/or used in any other suitable manner.

The method 200 preferable includes repeating S220 (e.g., changing the signal encoded by the emitted light during each such repetition). While repeating S220, the method preferably includes substantially maintaining the same spectral filter bank control. However, the method can alternatively include changing the filter bank control (e.g., encoding a new matrix) between (and/or during) different repetitions of S220. The method preferably includes continuing to perform S230 throughout the repetitions of S220 (e.g., receiving the outputs associated with each repetition of S220).

Repeating S220 can function to enable rapid computation based on many different input signals. In some examples, S220 is repeated at a rate of 20 GS/s (e.g., 20 billion different input signals per second), 10 GS/s, 5 GS/s, 2.5 GS/s, 1 GS/s, 500 MS/s, 250 MS/s, 100 MS/s, 50 MS/s, 25 MS/s, 10 MS/s, 5 MS/s, 2.5 MS/s, 1 MS/s, 500 kS/s, 250 kS/s, 100 kS/s, 50 kS/s, 10-100 kS/s, 100-1000 kS/s, 1-10 MS/s, 10-50 MS/s, 50-200 MS/s, 200-500 MS/s, 0.5-2 GS/s, 2-8 GS/s, 8-32 GS/s, and/or any other suitable rate. In a specific example, in which the system includes 256 channels (e.g., 256 emitters) and each channel encodes a 4-bit signal (e.g., 4 mantissa bits), a repetition rate of 5 or 10 GS/s can result in an input signal rate of over 5 or 10 Tbit/s, respectively.

Figure 7A:
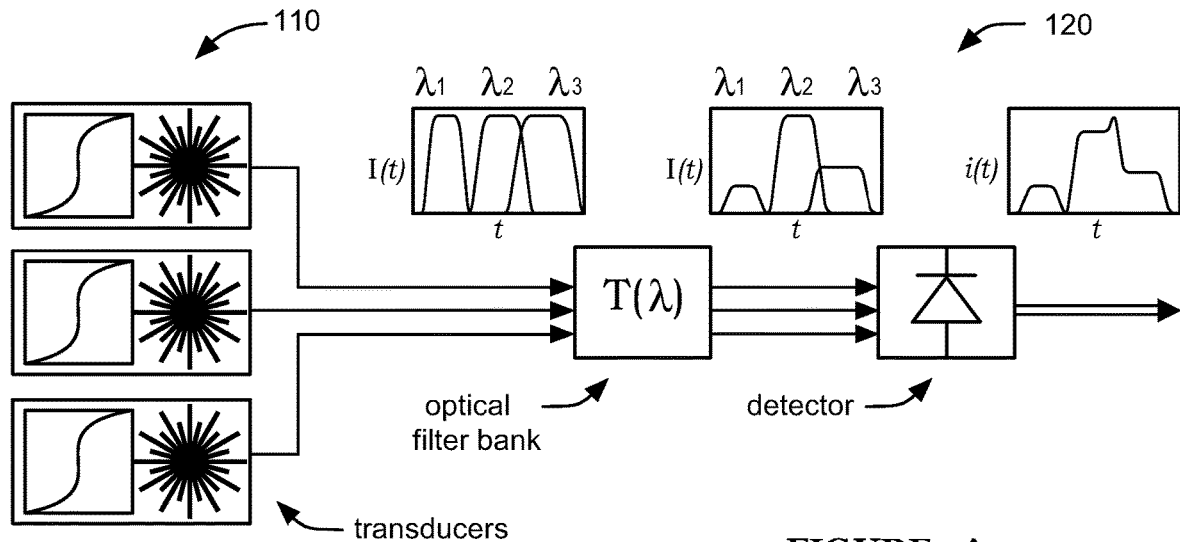
FIGS. 7A-7B are schematic representations of a first and second example, respectively, of photonic elements of the system.
Figure 7B:
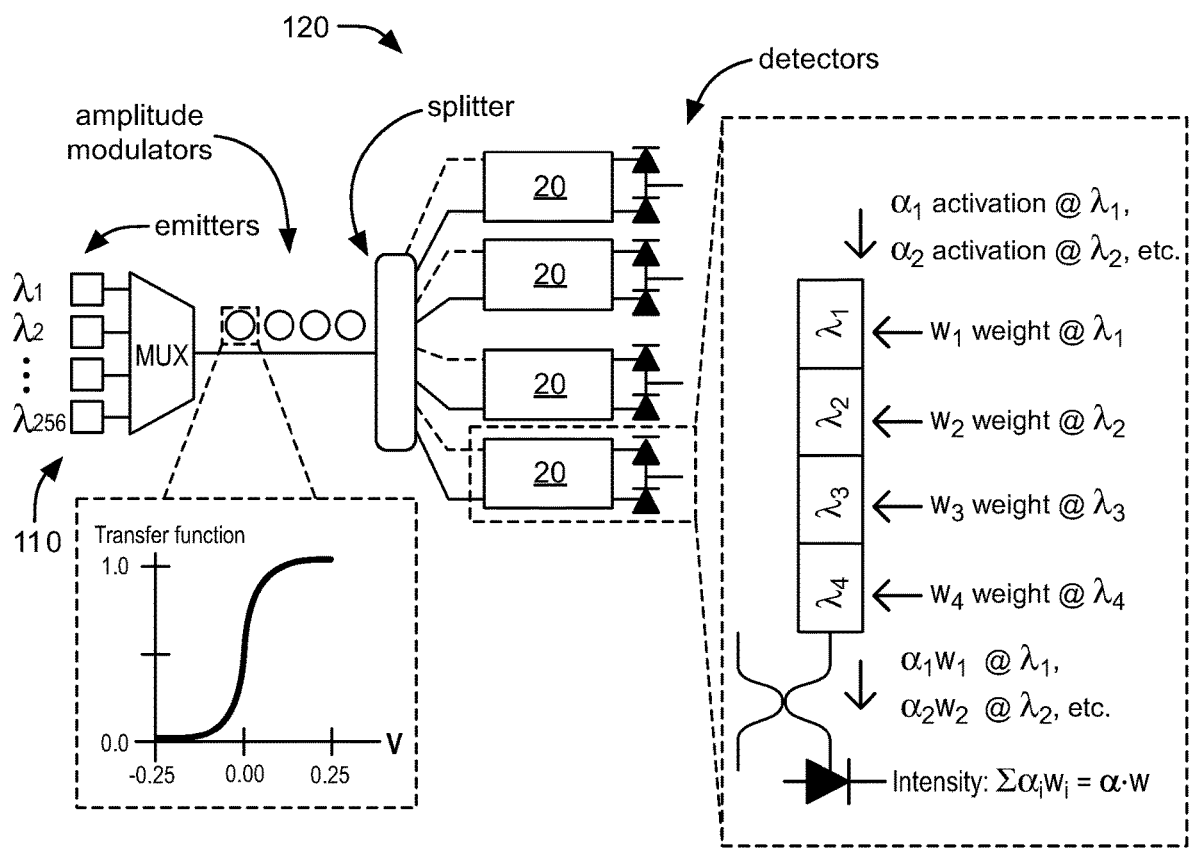

In one example, S210 and/or S220 are performed such as shown in FIG. 7B. Although FIG. 7B depicts specific examples of various elements of the input module 110 (e.g., transducers such as emitters, filters, and/or modulators) and computation module 120 (e.g., spectral filter banks, detectors, etc.), a person of skill in the art will recognize that the S210 and/or S220 could additionally or alternatively be performed using a system with any other suitable examples of these elements (e.g., as described above regarding the system 100).

However, the method can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The invention claimed is:

1. A system for optical modulation, the system comprising:
    a first splitter configured for splitting an input optical signal, comprising a first optical signal in a first wavelength channel and a second optical signal in a second wavelength channel different than the first wavelength channel, into a first split signal and a second split signal with both the first optical signal and the second optical signal;
    a first waveguide configured to receive the first split signal;
    a second waveguide configured to receive the second split signal;
    a first output coupler optically coupling the first waveguide and the second waveguide, and including a first optical output, the first output coupler configured to interfere the first split signal and the second split signal;
    a first photonic bandgap phase modulator, arranged along the first waveguide, the first photonic bandgap phase modulator comprising:
        a first plurality of modulator segments configured to modulate the first optical signal based on a first control signal, and
        a second plurality of modulator segments configured to modulate the second optical signal based on a second control signal independently of the first plurality of modulator segments;
    wherein each of the first plurality of modulator segments comprises a first photonic crystal region with a first n-type portion on one side thereof and a first p-type portion on an opposite side thereof, configured to accept the first control signal therebetween; and
    wherein each of the first plurality of modulator segments is configured to undergo a first change in refractive index for light in the first wavelength channel without substantially changing the refractive index for light of other wavelength channels;
    wherein each of the second plurality of modulator segments comprises a second photonic crystal region with a second n-type portion on one side thereof and a second p-type portion on an opposite side thereof, configured to accept the second control signal therebetween; and
    wherein each of the second plurality of modulator segments is configured to undergo a second change in refractive index for light in the second wavelength channel without substantially changing the refractive index for light of the other channels.

2. The system of claim 1, wherein the first change in refractive index is a change in sign from a first refractive index to a second refractive index.

3. The system of claim 2, wherein an absolute value of the second refractive index is within 25% of the first refractive index.

4. The system of claim 1, further comprising:
    a second photonic bandgap phase modulator, arranged along the second waveguide, the second photonic bandgap phase modulator comprising:
        a third plurality of modulator segments configured to modulate the first optical signal in the second split signal based on a third control signal, and
    wherein each of the third plurality of modulator segments comprises a third photonic crystal region with a third n-type portion on one side thereof and a third p-type portion on an opposite side thereof, configured to accept the third control signal therebetween; and
    wherein each of the third plurality of modulator segments is configured to undergo a third change in refractive index for light in the first wavelength channel without substantially changing the refractive index for light of the other wavelength channels.

5. The system of claim 4, wherein the first change is refractive index is configured to cause a positive phase shift between the first optical signal in the first split signal and the first optical signal in the second split signal; and
    wherein the third change is refractive index is opposite to the first change in refractive index configured to cause a negative phase shift between the first optical signal in the first split signal and the first optical signal in the second split signal.

6. The system of claim 1, further comprising:
    a second photonic bandgap phase modulator, arranged along the second waveguide, the second photonic bandgap phase modulator comprising:
        a third plurality of modulator segments configured to modulate a third optical signal in the second split signal based on a third control signal, and
    wherein each of the third plurality of modulator segments comprises a third photonic crystal region with a third n-type portion on one side thereof and a third p-type portion on an opposite side thereof, configured to accept the third control signal therebetween; and
    wherein each of the third plurality of modulator segments is configured to undergo a third change in refractive index for light in the third wavelength channel without substantially changing the refractive index for light of the other wavelength channels.

7. The system of claim 1, wherein the first splitter is also configured for splitting the input optical signal into a third split signal and a fourth split signal;
    wherein the system further comprises:
        a third waveguide configured to receive the third split signal;
        a fourth waveguide configured to receive the fourth split signal;
        a second output coupler optically coupling the third waveguide and the fourth waveguide, and including a second optical output, the second output coupler configured to interfere the third split signal and the fourth split signal;
        a second photonic bandgap phase modulator, arranged along the third waveguide, the second photonic bandgap phase modulator comprising:
            a third plurality of modulator segments configured to modulate a third optical signal in a third wavelength channel based on a third control signal, and
        wherein each of the third plurality of modulator segments comprises a third photonic crystal region with a third n-type portion on one side thereof and a third p-type portion on an opposite side thereof, configured to accept the third control signal therebetween; and
        wherein each of the third plurality of modulator segments is configured to undergo a third change in refractive index for light in the third wavelength channel without substantially changing the refractive index for light of other wavelength channels.

8. The system of claim 7, wherein the first splitter comprises:
- a wavelength selective element for splitting the third optical signal from the first optical signal and the second optical signal;
- a first wavelength-independent splitter for splitting the first split signal from the second split signal; and
- a second wavelength-independent splitter for splitting the third split signal from the fourth split signal.

9. The system of claim 1, wherein the first photonic bandgap phase modulator comprises a third plurality of modulator segments;
- wherein the third plurality of modulator segments are configured to modulate the first optical signal and the second optical signal, independently of the first plurality of modulator segments and the second plurality of modulator segments.

10. The system of claim 1, further comprising:
- a drop filter configured to branch a sub-path off the first waveguide, and
- an add filter to rejoin the sub-path to the first waveguide;
- wherein the first photonic bandgap phase modulator is along the sub-path.

11. The system of claim 1, wherein segment lengths of each of the first plurality of modulator segments define a sequence from a shortest segment length to a longest segment length, wherein the sequence substantially defines a geometric progression.

12. The system of claim 11, wherein the geometric progression defines a common ratio equal to 2.

13. The system of claim 1, wherein the first photonic crystal region and the second photonic crystal region comprise a continuous photonic crystal.

14. The system of claim 13, wherein the continuous photonic crystal includes a first side and a second side opposing the first side; and
- wherein the first plurality of modulator segments comprises a first modulator segment, and a second modulator segment adjacent to the first modulator segment.

15. The system of claim 14, wherein the first n-type portion of the first modulator segment is arranged along the first side of the continuous photonic crystal;
- wherein the first p-type portion of the first modulator segment is arranged along the second side of the continuous photonic crystal;
- wherein the first n-type portion of the second modulator segment is arranged along the second side of the continuous photonic crystal, adjacent to the first p-type portion of the first modulator segment; and
- wherein the first p-type portion of the second modulator segment is arranged along the first side of the continuous photonic crystal, adjacent to the first n-type portion of the first modulator segment.

16. The system of claim 15, further comprising isolation regions between the first n-type portion of the first modulator segment and the first p-type portion of the second modulator segment.

17. The system of claim 14, wherein the first n-type portion of the first modulator segment is arranged along the first side of the continuous photonic crystal;
- wherein the first p-type portion of the first modulator segment is arranged along the second side of the continuous photonic crystal;
- wherein the first n-type portion of the second modulator segment is arranged along the first side of the continuous photonic crystal, adjacent to the first n-type portion of the first modulator segment; and
- wherein the first p-type portion of the second modulator segment is arranged along the second side of the continuous photonic crystal, adjacent to the first p-type portion of the first modulator segment; and
- further comprising isolation regions between the first n-type portion of the first modulator segment and the first n-type portion of the second modulator segment, and between the first p-type portion of the first modulator segment and the first p-type portion of the second modulator segment.

18. The system of claim 1, further comprising:
- a first emitter configured for generating the first optical signal;
- a second emitter configured for generating the second optical signal; and
- a multiplexer configured for combining the first optical signal and the second optical signal into the input optical signal.

* * * * *